(12) United States Patent
Baxley et al.

(10) Patent No.: US 8,358,644 B2
(45) Date of Patent: Jan. 22, 2013

(54) METHODS AND APPARATUS FOR GENERATING SYNCHRONIZATION/PILOT SEQUENCES FOR EMBEDDING IN WIRELESS SIGNALS

(75) Inventors: Robert John Baxley, Atlanta, GA (US); John Eric Kleider, Atlanta, GA (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 872 days.

(21) Appl. No.: 12/051,535

(22) Filed: Mar. 19, 2008

(65) Prior Publication Data

US 2009/0003308 A1     Jan. 1, 2009

Related U.S. Application Data

(60) Provisional application No. 60/911,787, filed on Apr. 13, 2007.

(51) Int. Cl.
*H04J 3/06* (2006.01)
*H04L 7/00* (2006.01)

(52) U.S. Cl. ........................................ 370/350; 375/354
(58) Field of Classification Search .................. 370/350; 375/354

See application file for complete search history.

(56) References Cited

U.S. PATENT DOCUMENTS

| | | | |
|---|---|---|---|
| 5,867,478 | A | 2/1999 | Baum et al. |
| 6,314,146 | B1 | 11/2001 | Tellado et al. |
| 6,369,758 | B1 | 4/2002 | Zhang |
| 6,411,610 | B1 * | 6/2002 | Li et al. .......................... 370/335 |
| 6,473,467 | B1 | 10/2002 | Wallace et al. |
| 6,487,252 | B1 | 11/2002 | Kleider et al. |
| 6,549,561 | B2 | 4/2003 | Crawford |
| 6,549,583 | B2 | 4/2003 | Crawford |
| 6,567,374 | B1 | 5/2003 | Bohnke et al. |
| 6,628,735 | B1 | 9/2003 | Belotserkovsky et al. |
| 6,633,616 | B2 | 10/2003 | Crawford |
| 6,700,866 | B1 | 3/2004 | Heinonen et al. |
| 6,757,299 | B1 | 6/2004 | Verma |
| 6,853,632 | B1 | 2/2005 | Verma et al. |
| 6,928,062 | B2 | 8/2005 | Krishnan et al. |
| 6,985,535 | B2 | 1/2006 | Park et al. |
| 7,027,464 | B1 | 4/2006 | Nakahara et al. |

(Continued)

OTHER PUBLICATIONS

J. K. Cavers, "An Analysis of Pilot Symbol Assisted Modulation for Rayleigh Fading Channels," IEEE Transactions on Vehicular Technology, vol. 40, No. 4, pp. 686-693, Dec. 1991.

(Continued)

*Primary Examiner* — Derrick Ferris
*Assistant Examiner* — Majid Esmaeilian
(74) *Attorney, Agent, or Firm* — Ingrassia Fisher & Lorenz, P.C.

(57) ABSTRACT

An embodiment includes a method for generating a set of synchronization/pilot sequences (SPS) by generating a plurality of candidate SPS using different initial conditions. Correlations are performed among the candidate SPS to generate a plurality of correlation values, and a plurality of permutations of the candidate SPS are determined, where each permutation includes a different set of candidate SPS, and wherein each permutation includes a number, D, of candidate SPS. In addition a selected permutation is identified from the plurality of permutations, where the selected permutation corresponds to the set of SPS being generated. A system includes a transmitter adapted to generate a wireless signal in which an SPS is embedded by combining each SPS of the set with phase shifted input data, determining peak-to-average power ratios (PARs) for at least some of the combined signals, and identifying a selected combined signal based on the PARs.

20 Claims, 14 Drawing Sheets

U.S. PATENT DOCUMENTS

| | | | |
|---|---|---|---|
| 7,042,857 | B2 | 5/2006 | Krishnan et al. |
| 7,164,649 | B2 | 1/2007 | Walton et al. |
| 7,190,734 | B2 | 3/2007 | Giannakis et al. |
| 7,206,606 | B2 | 4/2007 | Kobayashi et al. |
| 7,233,625 | B2 | 6/2007 | Ma et al. |
| 7,269,430 | B2 | 9/2007 | Moorti et al. |
| 7,289,588 | B2 * | 10/2007 | Suh et al. ............... 375/367 |
| 7,317,750 | B2 | 1/2008 | Shattil |
| 7,324,605 | B2 | 1/2008 | Maltsev et al. |
| 7,359,311 | B1 | 4/2008 | Paranjpe et al. |
| 7,403,570 | B2 | 7/2008 | Ma et al. |
| 7,406,261 | B2 | 7/2008 | Shattil |
| 7,421,046 | B2 | 9/2008 | Wallace et al. |
| 7,471,728 | B2 | 12/2008 | Brutel et al. |
| 7,590,171 | B2 | 9/2009 | Chang et al. |
| 7,656,975 | B2 | 2/2010 | Tandon et al. |
| 7,688,907 | B2 | 3/2010 | Dang |
| 7,764,593 | B2 | 7/2010 | Kim et al. |
| 7,856,048 | B1 | 12/2010 | Smaini et al. |
| 7,881,181 | B2 | 2/2011 | Dapper et al. |
| 8,098,713 | B2 | 1/2012 | Baxley et al. |
| 2004/0196921 | A1 | 10/2004 | Matsumoto et al. |
| 2005/0043052 | A1 | 2/2005 | Whinnett et al. |
| 2005/0105505 | A1 * | 5/2005 | Fishler et al. ............ 370/349 |
| 2005/0135503 | A1 | 6/2005 | Talwar et al. |
| 2005/0157814 | A1 | 7/2005 | Cova et al. |
| 2006/0018250 | A1 | 1/2006 | Gu et al. |
| 2006/0239233 | A1 * | 10/2006 | Hanada et al. ............ 370/335 |
| 2006/0250936 | A1 | 11/2006 | Chen et al. |
| 2006/0291431 | A1 * | 12/2006 | Pajukoski et al. ......... 370/335 |
| 2007/0089015 | A1 | 4/2007 | Saul |
| 2007/0098100 | A1 | 5/2007 | Charbit et al. |
| 2007/0211835 | A1 * | 9/2007 | Inagawa et al. ........... 375/343 |
| 2007/0253472 | A1 * | 11/2007 | Jang ......................... 375/150 |
| 2008/0075195 | A1 * | 3/2008 | Pajukoski et al. ......... 375/298 |
| 2008/0089437 | A1 | 4/2008 | Frederiksen et al. |
| 2008/0095263 | A1 * | 4/2008 | Xu et al. ................... 375/295 |
| 2008/0117995 | A1 | 5/2008 | Anderson et al. |
| 2009/0011722 | A1 | 1/2009 | Kleider et al. |
| 2009/0021303 | A1 | 1/2009 | Vinayak et al. |
| 2009/0052561 | A1 | 2/2009 | Baxley et al. |
| 2009/0207936 | A1 | 8/2009 | Behzad |
| 2009/0316826 | A1 | 12/2009 | Koren et al. |
| 2010/0002784 | A1 * | 1/2010 | Hlinka et al. ............. 375/260 |
| 2010/0029310 | A1 * | 2/2010 | Li et al. .................... 455/466 |
| 2010/0035554 | A1 | 2/2010 | Ba et al. |
| 2010/0091702 | A1 | 4/2010 | Luo et al. |
| 2010/0118990 | A1 | 5/2010 | Lee et al. |
| 2010/0195609 | A1 | 8/2010 | Li et al. |
| 2010/0272197 | A1 | 10/2010 | Har et al. |
| 2012/0140838 | A1 | 6/2012 | Kadous et al. |

OTHER PUBLICATIONS

"IEEE Standard Local and Metropolitan Area Network," IEEE Std. 802.16a, Jan. 2003.

R. Negi et al., "Pilot Tone Selection for Channel Estimation in a Mobile OFDM System," IEEE Transactions on Consumer Electronics, vol. 44, pp. 1122-1128, Aug. 1998.

M. Morelli et al., "A Comparison of Pilot-Aided Channel Estimation Methods for OFDM Systems," IEEE Trans. on Signaling Processing, vol. 49, No. 12, pp. 3065-3073, 2001.

J. E. Kleider et al., "Preamble and Embedded Synchronization for RF Carrier Frequency-Hopped OFDM," IEEE Journal on Selected Areas in Communications, vol. 23, No. 5, pp. 920-931, May 2005.

J. Tellado, "Peak to Average Power Reduction for Multicarrier Modulation," Dissertation submitted to the Dept. of Electrical Engineering, Sep. 1999.

R. W. Bauml et al., "Reducing the Peak-to-Average Power Ratio of Multicarrier Modulation by Selected Mapping," Electronics Letters, vol. 32, pp. 2056-2057, Oct. 1996.

S. O'Hara, B. Chen et al., "A Bandwidth Efficient Peak Power Reduction Scheme for Multicarrier Modulation Using Selected Mapping," Proc. Conference on Information Sciences and Systems, Mar. 2003.

R. J. Baxley et al., "Magnitude-Scaled Selected Mapping: A Crest Factor Reduction Scheme for OFDM Without Side-Information Transmission," Proc. IEEE Intl. Conference on Acoustics, Speech, and Signal Processing, Apr. 2007.

A. D. S. Jayalath et al., "SLM and PTS Peak-Power Reduction of OFDM Signals Without Side Information," IEEE Transactions on Wireless Communications, vol. 4, pp. 2006-2013, Sep. 2005.

R. J. Baxley et al., "MAP Metric for Blind Phase Sequence Detection in Selected Mapping," IEEE Transactions on Broadcasting, vol. 51, pp. 565-570, Dec. 2005.

N. Chen et al., "Peak-to-Average Power Ratio Reduction in OFDM with Blind Selected Pilot Tone Modulation," IEEE Transactions on Wireless Communications, vol. 5, pp. 2210-2216, Aug. 2006.

F. Tufvesson et al., "Time and Frequency Synchronization for OFDM Using PN-Sequence Preambles," Proc. IEEE Vehicular Technology Conference, (Amsterdam, Netherlands), pp. 2203-2207, Sep. 1999.

N. Chen et al., "Superimposed Training for OFDM: A Peak-to-Average Power Ratio Analysis," IEEE Transactions on Signal Processing, vol. 54, pp. 2277-2287, Jun. 2006.

R. J. Baxley et al., "Embedded Synchronization/Pilot Sequence Creation Using POCS," Proc. IEEE International Conference on Acoustics, Speech and Signal Processing, 2006., pp. 321-324, May 2006.

R. J. Baxley et al., "Pilot Design for IEEE 802.16 OFDM and OFDMA," in Proc. IEEE International Conference on Acoustics, Speech and Signal Processing, Apr. 2007.

Z. Wang et al., "Wireless Multicarrier Communications," IEEE Signal Processing Magazine, vol. 17, pp. 29-48, May 2000.

X. Cai et al., "Error Probability Minimizing Pilots for OFDM with m-PSK Modulation Over Rayleigh-Fading Channels," IEEE Transactions on Vehicular Technology, vol. 53, pp. 146-155, Jan. 2004.

E. Larsson et al., "Preamble Design for Multiple-Antenna OFDM-Based WLANs with Null Subcarriers," IEEE Signal Processing Letters, vol. 8, pp. 285-288, Nov. 2001.

M. Dong et al., "Optimal Pilot Placement for Channel Tracking in OFDM," Proc. Military Communications Conference 2002, pp. 602-606, Nov. 2002.

M. Dong et al., "Optimal Design and Placement of Pilot Symbols for Channel Estimation," IEEE Transactions on Signal Processing, vol. 50, No. 12, pp. 3055-3069, Dec. 2002.

L. Tong et al., "Pilot-Assisted Wireless Transmissions: General Model, Design Criteria, and Signal Processing," IEEE Signal Processing Magazine, vol. 21, pp. 12-25, Nov. 2004.

X. Cai et al., "Adaptive PSAM Accounting for Channel Estimation and Prediction Errors," IEEE Transactions on Wireless Communications, vol. 4, pp. 246-256, Feb. 2005.

J. Diaz et al., "Impact of Imperfect Channel State Information Upon the Outage Capacity of Rayleigh Fading Channels," Proc. IEEE Global Telecommunications Conference, 2004, pp. 887-892, Dec. 2004.

R. You et al., "Diversity Combining with Imperfect Channel Estimation," IEEE Transactions on Communications, vol. 53, pp. 1655-1662, Oct. 2005.

T. Weber et al., "Imperfect Channel-State Information in MIMO Transmission," IEEE Transactions on Communications, vol. 54, pp. 543-552, Mar. 2006.

S. Kay, Fundamentals of Statistical Signal Processing, vol. 1: Estimation Theory. Englewood Cliffs, NJ: Prentice-Hall, pp. 521-523, Jan. 1993.

S. Chennakeshu et al., "Error Rates for Rayleigh Fading Multichannel Reception of MPSK Signals," IEEE Transactions on Communications, vol. 43, pp. 338-346, February, March, Apr. 1995.

J. Proakis, Digital Communications, New York, NY: McGraw-Hill, p. 817, Jan. 2001.

S. Boyd et al.E, Convex Optimization. Cambridge University Press, Jan. 2004.

"Lagrange Multipliers," http://en.wikipedia.org/wiki/Lagrange_multipliers, retrieved on Jan. 16, 2007.

J. Tellado et al., "PAR Reduction in Multicarrier Transmission Systems," Feb. 1998.

Alamouti, S. "A simple transmit diversity technique for wireless communications," IEEE JSAC, vol. 16, No. 8, Oct. 1998, pp. 1451-1458.

Anderson, K., et al. "Two dimensional diversity enhancement for tactical wireless networks using multi-carrier cooperative networking," in proceedings of SDR Forum Technical Conference 2006.

Baxley, R.J., et al. "A method for joint peak-to-average power radio reduction and synchronization in OFDM," accepted MILCOM, Orlando, FL, Oct. 2007.

Baxley, R.J., et al. "Pilot design for OFDM with null edge subcarriers," IEEE Trans. Wireless Commuincations, vol. 8, No. 1, pp. 396-405, Jan. 2009.

Cao, Z., et al. "Frequency synchronization fro generalized OFDMA uplink," in Proc. IEEE Globecomm, 2004.

Choi, J., et al. "Carrier frequency offset compensation for uplink of OFDM-FDAM systems," IEEE Trans. Commun., 2005.

Cui, T., et al. "Joint frequency offset and channel estimation for OFDM," in Proc. Globecom, vol. 1, pp. 15-19, Dec. 2006.

Dai, H. "Distributed versus co-located MIMO systems with correlated fading and shadowing," in Proc. of ICASSP, vol. IV, May 2006, pp. 561-564.

Fechtel, S. "OFDM carrier and sampling frequency syncronization and its performance on stationary and mobile channels," IEEE Trans Cons. Elect., vol. 46, No. 3, Aug. 2000.

Gault, S., et al. "Joint sampling clock offset and channel estimation for OFDM Signals: Cramer-Rao bound and algorithms," IEEE Trans. Signal Proc., vol. 54, No. 5, pp. 1875-1885, May 2006.

Ghogho, M., et al. "Semi-blind frequency offset synchronization for OFDM," in Proc. ICASSP, vol. 3, pp. 2333-2336, May 2002.

Giannakis, G., et al. Space-Time Coding for Broadband Wireless Communications, John Wiley and Sons, Hoboken, NJ, 2007. www.researchandmarkets.com/reports/449857.

Goldsmith, A., et al. "Capacity limits of MIMO channels," IEEE, JSAC, vol. 21, No. 5, Jun. 2003, pp. 684-702.

Huang, D., et al. "An Interference cancellation scheme for carrier frequency offsets correction in OFDMA systems," IEEE Trans. Commun., 2005.

Jayalath, A.D.S., et al. Blind SLM receiver for PAR-reduced OFDM, PRoc. IEEE Vehicular Technology Conference, pp. 219-222, Sep. 2002.

Kleider, J., et al. "Timing synchronization in distributed mobile MISO rayleigh fading channels," in Proc. MILCOM, pp. 1-7, Oct. 2007.

Kleider, J., et al. "MISO joint synchronization-pilot design for OFDM systems," in Proc. ICASSP, pp. 3033-3036, Mar.-Apr. 2008.

Le, H.N., et al. "Joint channel estimation and synchronization for MIMO-OFDM in the presence of carrier and sampling frequency offsets," IEEE Trans. on Vehicular Technology, vol. 58, No. 6, Jul. 2009.

Li, X. "Space0time coded multi-transmission among distributed transmitters without perfect synchronization," IEEE Signal Processing Letters, vol. 11, No. 12, Dec. 2004, 948-951.

Lu, B., et al. "Iterative receivers for space-time block-coded OFDM systems in dispersive fading channels," IEEE Trans. on Commun., vol. 53, No. 1, pp. 162-172, Jan. 2005.

Ma, X., et al. "Joint frequency offset and channel estimation for OFDM," in Proc. Globecom, vol. 1, pp. 15-19, Dec. 2006.

Ma, X., et al. "Hopping pilots for estimation of frequency offset and multiantenna channels in MIMO-OFDM," IEEE Trans. on Commun., vol. 1, No. 2, pp. 213-225, Apr. 2002.

Ma, Q. et al. "Differential space-time-frequency coded OFDM with maximum multipath diversity," IEEE Trans. Wireless Commun., vol. 4, No. 5, pp. 2232-2243, Sep. 2005.

Ohno, S. "Preamble and pilot symbol design for channel estimation in FDM," in Proc. ICASSP, vol. 3, pp. 281-284, Apr. 2007.

Pun, M.O., et al. "Iterative detection and frequcny synchronization for OFDMA uplink transmissions," in IEEE Trans. Wireless Commun., Feb. 2007.

Schmidl, T.M., et al. "Robust frequency and timing synchronization for OFDM," IEEE Trans on Commun., vol. 45, No. 12, pp. 1613-1621, Dec. 1997.

Tonello, A. "Multiuser detection and turbo multiuser decoding for asynchronous multitone multiple access," in Proc. IEEE Veh. Techn. Conf., 2002.

van Zelst, A., et al. "Implementation of a MIMO-OFDM-based wireless LAN system," IEEE Trans. Signal PRoc., vol. 52, No. 2, pp. 483-494, Feb. 2004.

Final Office Action issued Jul. 15, 2011 in U.S. Appl. No. 12/102,677.

U.S. Office Action for U.S. Appl. No. 12/102,677 mailed Feb. 2, 2011.

U.S. Office Action issued Jun. 24, 2011 in U.S. Appl. No. 12/038,983.

Notice of Allowance issued Oct. 27, 2011 in U.S. Appl. No. 12/038,983.

Notice of Allowance issued Apr. 3, 2012 in U.S. Appl. No. 12/649,672.

USPTO Non-Final Office Action mailed May 3, 2012; U.S. Appl. No. 13/359,205, filed Jan. 26, 2012.

USPTO "Non-Final Office Action" mailed May 25, 2012; U.S. Appl. No. 12/567,505, filed Sep. 25, 2009.

USPTO "Notice of Allowance" mailed Jun. 19, 2912; U.S. Appl. No. 12/649,672, filed Dec. 30, 2009.

USPTO "Non-Final Office Action" mailed Jun. 22, 2012; U.S. Appl. No. 12/567,509, filed Sep. 25, 2009.

USPTO "Notice of Allowance" mailed Jul. 30, 2012; U.S. Appl. No. 13/359,205, filed Jan. 26, 2012.

USPTO "Notice of Allowance" mailed Aug. 21, 2012; U.S. Appl. No. 12/567,505, filed Sep. 25, 2009.

USPTO "Final Office Action" mailed Aug. 28, 2012; U.S. Appl. No. 12/567,509, filed Sep. 25, 2009.

USPTO "Notice of Allownce" mailed Oct. 11, 2012; U.S. Appl. No. 12/725,985, filed Mar. 17, 2010.

* cited by examiner

METHODS AND APPARATUS FOR GENERATING SYNCHRONIZATION/PILOT SEQUENCES FOR EMBEDDING IN WIRELESS SIGNALS

CROSS-REFERENCE TO RELATED APPLICATION

This application claims the benefit of U.S. Provisional Application No. 60/911,787, filed Apr. 13, 2007.

GOVERNMENT LICENSE RIGHTS

The U.S. Government may have certain rights to some or all of the inventive subject matter of the present application as provided for by the terms of contract No. DAAD19-01-2-0011 awarded by Army Research Laboratory.

TECHNICAL FIELD

The inventive subject matter generally relates to methods and apparatus for wirelessly communicating signals, and more particularly to methods and apparatus for generating synchronization/pilot sequences and wirelessly communicating signals in which the synchronization/pilot sequences are embedded.

BACKGROUND

Orthogonal frequency division multiplexing (OFDM) is a modulation method used in traditional, high-speed wireless networks. However, waveforms generated using traditional OFDM techniques exhibit noise-like properties, and thus OFDM waveforms tend to suffer from relatively large peak-to-average ratios (PARs), which in turn may lead to significant distortion noise and low power efficiency in peak-limited channels. In addition, under relatively harsh channel conditions, transmitted OFDM signals tend to incur significant timing offsets and carrier frequency offsets. Because traditional OFDM techniques tend not to be robust under harsh channel conditions, significant timing offsets may result in inter-block interference, and significant carrier frequency offsets may result in inter-carrier interference. Both of these forms of interference are detrimental to the bit error rates of received signals.

In order to estimate the channel and to address timing and carrier frequency offsets, some traditional OFDM devices transmit a preamble in conjunction with and preceding an information-bearing OFDM sequence. The receiver may perform a conjugate correlation of the received preamble and an expected preamble to determine estimates for the timing and carrier frequency offsets. In addition, when the preamble also includes channel training information, the preamble also may be used to perform channel estimation. Although transmission of a preamble is relatively simple to implement, a tradeoff to implementing this technique is that a significant amount of bandwidth is used solely for preamble transmission, and thus for synchronization, acquisition, and, when channel training information is available, also for channel estimation.

In addition, the channel estimate naturally has some error, when compared with actual channel conditions. Traditional OFDM transmission methods may experience an increase in channel estimation errors on the receiver side, which may result from non-linear amplification, by a power amplifier device on the transmitter side, of transmit information sequences having higher than desired PARs. Such non-linear transmission may cause significant out-of-band interference (i.e., interference outside the signal bandwidth, such as in the adjacent channels and/or other user channels), and also may induce undesired in-band interference, which adds distortion the transmitted information bits and also to the channel training information. Furthermore, improper synthesis of the channel training information may lead to further channel estimation errors at the receiver. Thus, non-linear amplification of high peak-to-average power ratio signals and improper channel training information design may, in the receiver, result in unacceptably high channel estimation errors and excessively high bit error rates.

In some OFDM systems, prior to transmission, an information-bearing OFDM sequence is combined with a synchronization/pilot sequence, which provides spectral efficiency improvements over preamble-based synchronization approaches. Traditional sequences include, for example, Pseudorandom Number (PN) sequences, Gold codes, Kasami codes, and m-sequences. Although traditional synchronization/pilot sequences are appropriate for some situations, they do not provide for adequate system performance in other situations. For example, although traditional sequences are designed to perform relatively well for synchronization purposes, they are not designed to provide low PAR or flat frequency response in conjunction with optimal channel estimation by the receiver. Essentially, in an OFDM system, traditional synchronization/pilot sequences do not provide for adequate system performance in channel environments in which significant timing offsets, carrier frequency offsets, and multi-path fading effects simultaneously are present.

Accordingly, what are needed are methods and apparatus for generating synchronization/pilot sequences that provide for adequate system performance even under harsh channel conditions, and methods and apparatus for generating and transmitting OFDM waveforms in which these synchronization/pilot sequences are embedded. More particularly, what are needed are methods and apparatus for generating synchronization/pilot sequences that have synchronization properties that are at least as good as the synchronization properties of traditional sequences, and that also exhibit low-PAR properties and a flat frequency response. Other features and characteristics of the inventive subject matter will become apparent from the subsequent detailed description and the appended claims, taken in conjunction with the accompanying drawings and this background.

BRIEF DESCRIPTION OF THE DRAWINGS

The inventive subject matter will hereinafter be described in conjunction with the following drawing figures, wherein like numerals denote like elements.

DETAILED DESCRIPTION

Figure 1:
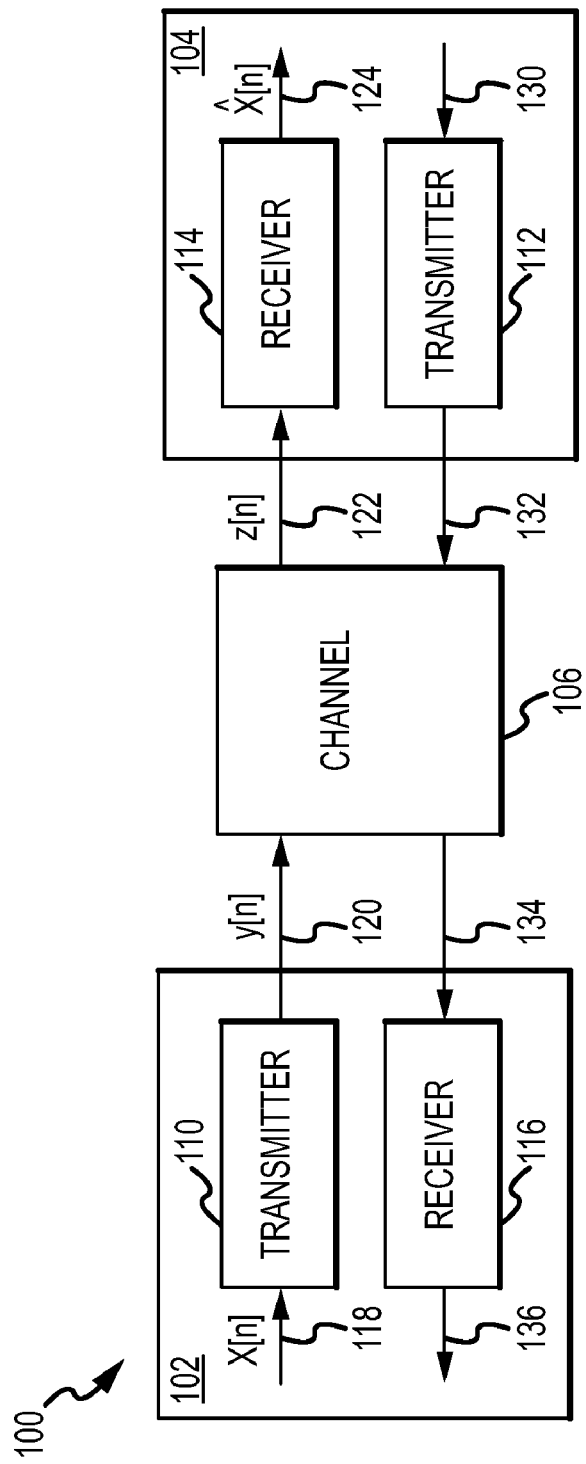
FIG. 1 is a simplified block diagram of a multi-carrier communication system that includes multiple wireless communication devices that communicate over a wireless communication channel, in accordance with an example embodiment.

The following detailed description of the inventive subject matter is merely exemplary in nature and is not intended to limit the inventive subject matter or the application and uses of the inventive subject matter. Furthermore, there is no intention to be bound by any theory presented in the following detailed description.

Embodiments include methods and apparatus for wirelessly communicating orthogonal frequency division multiplexing (OFDM) signals between wireless communication devices. A signal communicated according to an embodiment includes an embedded synchronization/pilot sequence (SPS) selected from a set of SPS that is accessible to a transmitter and a receiver, as will be described in detail below. As used herein, the acronym SPS may indicate a single synchronization/pilot sequence or multiple synchronization/pilot sequences. For example, the term "set of SPS" means a set of multiple synchronization/pilot sequences.

Embodiments include methods for generating SPS that may have one or more significant advantages over traditional techniques. More particularly, embodiments of methods for generating sets of SPS that may jointly provide for robust synchronization, low peak-to-average ratios (PARs), and accurate channel estimation, among other things. SPS generated according to various embodiments may have synchronization properties (e.g., compensation for timing offsets and frequency offsets) that are comparable to and potentially better than for synchronization/pilot sequences generated using traditional techniques. In addition, low PARs may be achieved because embodiments may enable a transmitter's power amplifier to be operated more efficiently. Improved channel estimation may be achieved because SPS may be generated, according to various embodiments, using arbitrary frequency domain profiles while achieving a relatively flat frequency response over all frequencies of interest to the signal. In addition to the above advantages, embodiments may result in increased link ranges, because signals may be transmitted using lower power, and correspondingly may be less susceptible to detection. Conversely, embodiments may result in higher link margins, as it may be possible to transmit higher-power signals using a given power amplifier, when compared to traditional techniques that utilize non-constant envelope transmissions. In addition, for battery-powered apparatus, improved battery life may be achieved, because the power amplifier may be operated at a higher efficiency than using traditional techniques. Embodiments may lead to higher power amplifier efficiency, as a signal that includes an SPS generated according to an embodiment may require substantially less back-off than a system that utilizes traditional synchronization/pilot sequences.

Embodiments may be utilized in various types of systems. For example, embodiments may be utilized in multi-carrier communication systems, single-carrier communication systems, and spread spectrum communication systems. Although embodiments discussed in detail below may pertain to a multi-carrier communication system, it is to be understood that other embodiments may apply to other types of systems, as well. Further, as will be explained in more detail below, embodiments include methods for generating a single SPS or for generating a set of SPS. Embodiments include embedded synchronization methods and apparatus that are employed in a selected mapping (SLM) system, and accordingly such embodiments may be referred to herein as SPS-SLM. It is to be understood that other embodiments may apply to systems in which selected mapping techniques are not employed.

FIG. 1 is a simplified block diagram of a multi-carrier communication system 100 that includes multiple wireless communication devices 102, 104 that communicate over a wireless communication channel 106, in accordance with an example embodiment. Multi-carrier communication system 100 may be, for example but not by way of limitation, a currently existing or future multi-carrier based, ultra-wideband system, an OFDM multiple access system, a multi-carrier code division multiple access (MC-CDMA) system, a digital video broadcasting system, a WiMax (long range broadband wireless) system, a wireless local area network (WiLAN) system (e.g., an 802.11a system), and/or a number of other types of multi-carrier communication systems.

Wireless communication devices 102, 104 may include, for example but not by way of limitation, a device selected from a group of devices comprising a cellular telephone, a radio, a one-way or two-way pager, a personal data assistant, a computer (e.g., a laptop or desktop computer), a base station, an unmanned autonomous vehicle, a wireless transmitter, and/or a wireless transceiver. Embodiments may be implemented in wireless communication devices 102, 104 that include both a transmitter 110, 112 and a receiver 114, 116 (e.g., each device 102, 104 includes a transceiver). In such embodiments, system 100 may provide for two-way communications between devices 102, 104. For example, transmitter 110 in a first device 102 may receive an input data symbol 118, X[n], and may generate and transmit, over channel 106, a wireless signal 120, y[n], which represents the input data symbol 118. Receiver 114 in a second device 104 may receive a channel-affected version 122, z[n], of the wireless signal 120, and may generate an output data symbol 124, X̂[n], representing an estimate of the input data symbol 118.

Additionally, transmitter 112 in the second device 104 may receive another input data symbol 130, and may generate and transmit, over channel 106, a wireless signal 132 representing the input data symbol. Receiver 116 in the first device 102 may receive a channel-affected version 134 of the wireless signal 132, and may generate an output data symbol 136 representing an estimate of the input data symbol 130. In other embodiments, system 100 may provide for one-way communications. For example, one device may include a transmitter (and no receiver) and another device may include a receiver (and no transmitter). In order to more clearly and simply describe the various embodiments, only one-way communications between a transmitter 110 in a first device 102 and a receiver 114 in a second device 104 is described in detail in the remainder of this description. It is to be understood that the various embodiments also apply to two-way communications as well.

Functionality of transmitter 110 and receiver 114, are described only briefly in conjunction with the description of FIG. 1. More detailed descriptions of the details of various transmitter and receiver embodiments are included later, in conjunction with FIGS. 3-6. Briefly, transmitter 110 is adapted to apply multiple phase shifts to an input data symbol 118, and to combine a plurality of SPS, which are selected from a set of SPS accessible to transmitter 110, with the phase shifted input data in order to produce a plurality of candidate signals. Embodiments of methods for generating SPS will be described in more detail later in conjunction with FIG. 6. First and second scaling factors may be applied to the input data symbol and to the plurality of SPS, respectively, prior to combining the phase shifted input data and the plurality of SPS. As will be discussed in detail later, the scaling factors affect the relative signal power allocated to the phase shifted input data and the SPS with which they are combined. Transmitter 110 also is adapted to determine PARs for at least some of the candidate signals, and to identify a selected candidate signal based on the PARs (e.g., the selected candidate signal may be the candidate signal with the lowest PAR). Transmitter 110 also is adapted to transmit a wireless signal 120 representing the selected candidate signal over the wireless communication channel 106.

Receiver 114 is adapted to receive a channel-affected version 122 of the wireless signal 120 from the wireless communication channel 106. Receiver 114 also is adapted to determine estimated channel perturbations within the channel-affected signal 122 based on its knowledge of the plurality of SPS, and to apply corrections to the channel-affected signal 122, based on the estimated channel perturbations. Receiver 114 also is adapted to produce the output data symbol 132 based on the corrected signal, which represents an estimate of the input data symbol 130 processed at the transmitter 110.

As alluded to above, a wireless signal transmitted over a channel (e.g., channel 106) may be adversely affected by the channel, and a receiver that receives a channel-affected version of the transmitted signal may attempt to determine and correct for estimated channel perturbations reflected within the channel-affected signal. In fact, the channel perturbations generated by channel 106 may not be the same for signals from transmitter 110 to receiver 114 as compared to a transmission from transmitter 112 to receiver 116. A number of factors may induce differences in the forward and reverse directions. For example, when either or both devices 102, 104 are mobile, channel 106 will be time variant, and the time that transmitter 110 transmits to receiver 114 may be different from the time than transmitter 112 may transmit to receiver 116. Thus, the channel 106 will be different depending on the transmit time for each transmitter 110, 112. Furthermore, the channel 106 itself may have different characteristics in the forward direction as compared to the reverse direction. These differences may be induced by a number of factors which include, for example, device 102 possessing a transmit/receive antenna having different characteristics from the transmit/receive antenna of device 104, and/or the local scattering environment being different for each device 102, 104, among other things. In order better to convey how a receiver may determine and correct for estimated channel perturbations, in accordance with various embodiments, a simplified channel model will now be described.

Figure 2:
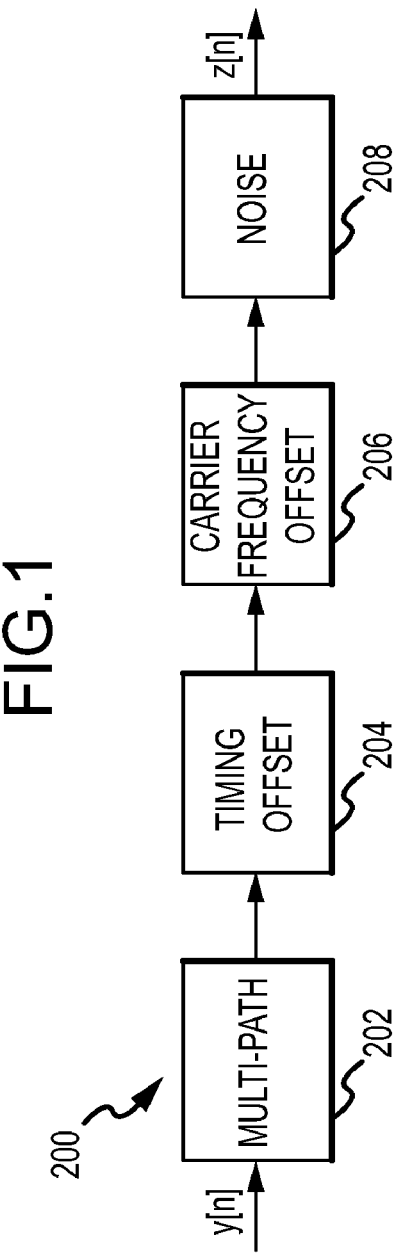
FIG. 2 is a simplified block diagram of a channel model, in accordance with an example embodiment.

FIG. 2 is a simplified block diagram of a channel model 200, in accordance with an example embodiment. In particular, channel model 200 illustrates various channel characteristics that may affect (e.g., perturb) a signal transmitted over the channel, and more particularly an unsynchronized mobile channel that communicates signals generated by a peak power-constrained system. These characteristics include, for example, a multi-path fading component 202 (which, in the frequency domain, manifests itself as frequency selective fading), a timing offset (TO) component 204, a carrier frequency offset (CFO) component 206, and an additive noise component 208. Although not strictly part of the channel model, the input-to-output characteristic of the transmitter's power amplifier (e.g., power amplifier 316, FIG. 3), which may or may not be assumed to be time-invariant, also may affect the characteristics of a transmitted wireless signal. A signal, $z[n]$, to which the channel model 200 and the power amplifier input-to-output characteristic has been applied may be represented, for example, by the equation:

$$z[n] = (f_{PA}(y[n-n_0]) * h[\tau])e^{-j2\pi\epsilon/N} + \eta[n],\quad \text{(Equation 1)}$$

where $f_{PA}(\cdot)$ represents the power amplifier input-to-output characteristic, which may be assumed to be time-invariant (although the input-to-output characteristic may be time-variant, in other embodiments), $h[\tau]$ represents multi-path fading component 202, $y[n-n_0]$ represents a transmitted signal, $y[n]$, subjected to a TO component 204, $e^{-j2\pi\epsilon/N}$ represents a CFO component 206, $\eta[n]$ represents an additive noise component 208, and * is the convolution operator.

Figure 3:
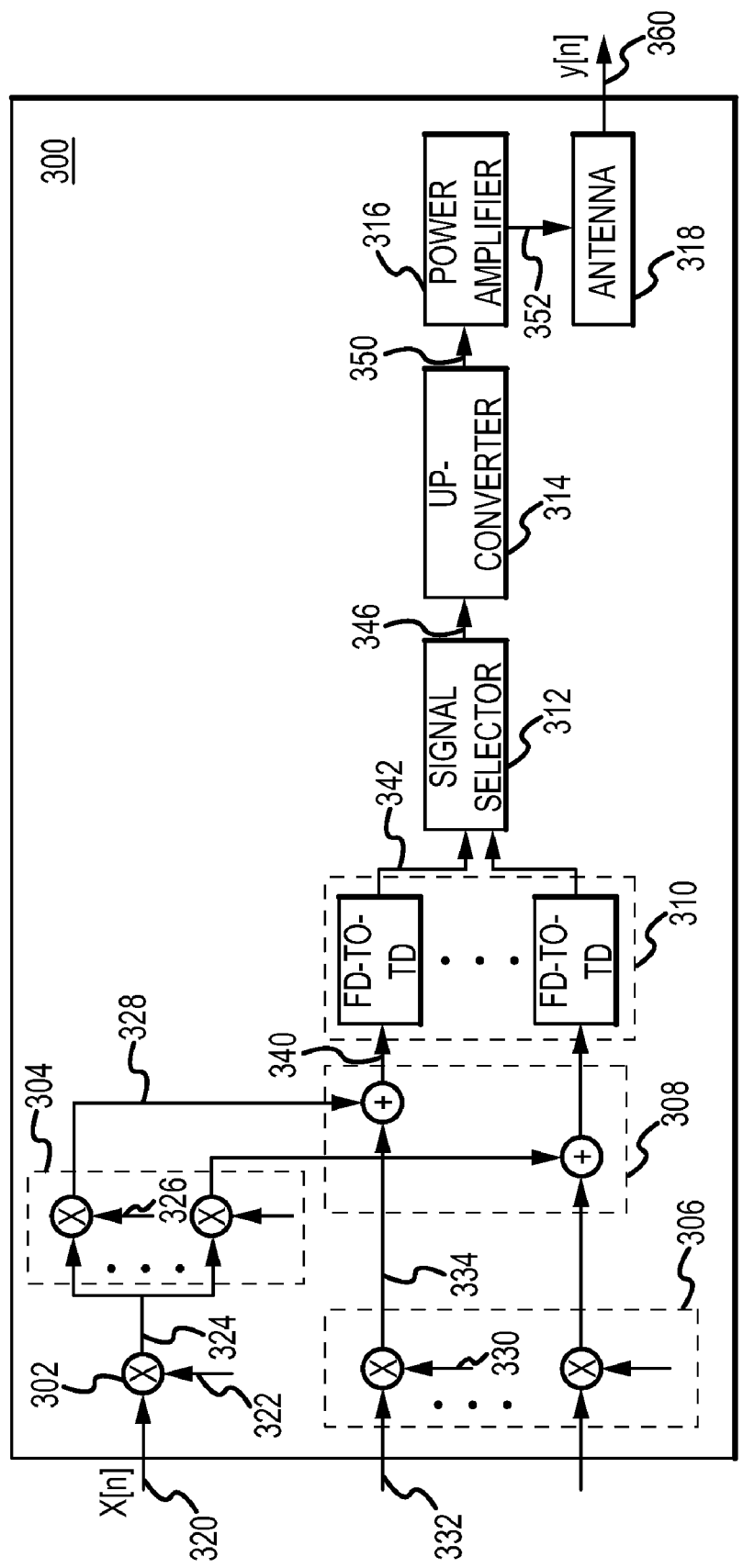
FIG. 3 is a simplified block diagram of a transmitter, in accordance with an example embodiment.

More detailed descriptions of various embodiments of transmitters (e.g., transmitter 110, FIG. 1) and receivers (e.g., receiver 114, FIG. 1) and methods of their operation will now be described. In particular, FIG. 3 is a simplified block diagram of a transmitter 300, in accordance with an example embodiment. Transmitter 300 includes a data/scaling factor combiner 302, a plurality of phase shifters 304, a plurality of SPS/scaling factor combiners 306, a plurality of data/SPS combiners 308, a plurality of frequency domain-to-time domain (FD-to-TD) transformers 310, a signal selector 312, an up-converter 314, a power amplifier 316, and an antenna 318 operatively coupled together as illustrated in FIG. 3, in an embodiment.

Data/scaling factor combiner 302 includes computational apparatus adapted to receive a sequence of input data symbols 320, $X_k$, each of which represents a data-bearing part of a signal to be transmitted. In an embodiment, $X_k$ is drawn from a finite constellation. Data/scaling factor combiner 302 is further adapted to apply a first scaling factor 322 to an input data symbol 320 in order to produce a scaled input data symbol 324. In an embodiment, the first scaling factor 322 has a value of $\sqrt{1-\rho}$, where $\rho$ is an embedding factor having a value between 0 and 1. The embedding factor represents a ratio of SPS power to signal power, which may be represented as $$\rho = \frac{\sum_k |S[k]|^2}{\sum_k |Y[k]|^2}.$$

In a particular embodiment, the embedding factor has a value in a range of about 0.25 to about 0.35. In another embodiment, the embedding factor has a value in a range of about 0.2 to about 0.4. In still other embodiments, the embedding factor may have higher or lower values than the above-given ranges. The scaled input data symbol 342 may be represented as $\sqrt{1-\rho}X_k$.

Each of the plurality of phase shifters 304 includes computational apparatus adapted to apply a different phase shift 326, $$e^{j\phi_k^{(d)}},$$

to the scaled input data symbol 324, in order to produce a plurality of phase shifted input data signals $$\sqrt{1-\rho}\,X_k^{(d)}e^{j\phi_k^{(d)}},$$

where D is a value referred to herein as a candidate number quantity, d is an index referred to herein as a relational index, and d∈{1, 2, ..., D}. The candidate number quantity, D, may be selected as any integer number from 1 to 16, in an embodiment, although the candidate number quantity may be a larger number, in other embodiments. In a particular embodiment, the candidate number quantity is selected as an integer number between 3 and 10. In an embodiment, the number of phase shifted input data signals 328 produced equals the candidate number quantity D, although the number of phase shifted input data signals 328 may be different, in other embodiments. The different phase shifts 326 may be represented within entries of a table of phase shift values, in an embodiment, and the relational index, d, may be used an index into the phase shift value table, among other things. Accordingly, the phase shift value table may have D entries, in an embodiment, although the phase shift value table may have more or fewer entries in other embodiments. Transmitter 300 also is adapted to obtain a plurality of SPS 332, $S_k^{(d)}$, each of which represents a unique synchronization/pilot sequence. In an embodiment, the plurality of SPS 332 may be obtained from a table of SPS, which is accessible to or stored in transmitter 300, and which includes one or more sets of pre-generated SPS, each of which may be referenced by a unique index (referred to below as an SLM index). Each SPS 332 in the transmitter's SPS table is represented in the frequency domain, in an embodiment. Embodiments of methods for generating sets of SPS will be described in more detail later in conjunction with FIG. 6.

SPS/scaling factor combiners 306 include computational apparatus adapted to apply second scaling factors 330 to the plurality of SPS 332 in order to produce a plurality of scaled SPS 334, $\sqrt{\rho}S_k^{(d)}$, where d is the relational index. Similar to its functionality with respect to the phase shift value table, the relational index, d, also may be used an index into the SPS table. When used in this context, the relational index alternatively may be referred to as an SLM index. As with the phase shift value table, the SPS table also may have D entries, although the SPS table may have more or fewer entries in other embodiments. In addition, in an embodiment, the number of scaled SPS 334 produced equals the candidate number quantity D, although the number of SPS 334 may be different, in other embodiments.

In the above-described embodiment, each different phase shift value 326 may be related to a unique SPS 332 via the relational index, d. In alternate embodiments, a particular phase shift value 326 may be related to multiple unique SPS 332, or a particular unique SPS 332 may be related to multiple phase shift values 326 (e.g., by including duplicate values in the phase shift value table or the SPS table, for example).

In an embodiment, the second scaling factor 330 has a value of $\sqrt{\rho}$, where ρ is the same embedding factor as the embedding factor incorporated in the first scaling factor 322. As will be more clearly depicted in conjunction with FIG. 4, later, because the first and second scaling factors 322, 330 have an inverse relationship, the value of the embedding factor, ρ, dictates how much relative signal power is allocated to a data-bearing component, $X_k^{(d)}$, of a transmitted signal as opposed to an SPS component, $S_k^{(d)}$, of the transmitted signal.

Phase shifters 304 provide the plurality of phase shifted input data signals 328 to data/SPS combiners 308, and SPS/scaling factor combiners 306 provide the plurality of scaled SPS 334 to data/SPS combiners 308. Each of data/SPS combiners 308 includes computational apparatus adapted to combine one of the plurality of phase shifted input data signals 328 with one of the scaled SPS 334 in order to produce a plurality of combined signals 340, where the plurality of combined signals 340 may be represented in the frequency domain by the equation:

$$Y_k^{(d)} = \sqrt{\rho}\,S_k^{(d)} + \sqrt{1-\rho}\,X_k^{(d)}e^{j\phi_k^{(d)}}. \qquad \text{(Equation 2)}$$

In an embodiment, the number of combined signals 340 produced equals the candidate number quantity D, although the number of combined signals 340 may be different, in other embodiments.

Data/SPS combiners 308 provide the plurality of combined signals 340 to FD-to-TD transformers 310. FD-to-TD transformers 310 include computational apparatus adapted to perform frequency domain-to-time domain transformations on each of the combined signals 340, in order to produce a plurality of candidate signals 342, $y^{(d)}[n]$. In an embodiment, the number of candidate signals 342 produced equals the candidate number quantity D, although the number of candidate signals 342 may be different, in other embodiments. The frequency domain-to-time domain transformation may include an inverse Fourier transform (IFT) or, more particularly, an inverse discrete Fourier transform (IDFT), in various embodiments, although other types of frequency domain-to-time domain transformations may be performed in other embodiments. Accordingly, in an embodiment, the plurality of candidate signals 342 may be represented as $y^{(d)}[n]$ =IDFT{$Y_k^{(d)}$} or alternatively by the following:

$$y^{(d)}[n] = \frac{1}{\sqrt{N}}\sum_{k=0}^{N-1} Y_k^{(d)} e^{j2\pi k n/N} \qquad \text{(Equation 3)}$$

$$= x^{(d)}[n]\sqrt{(1-\rho)} + s^{(d)}[n]\sqrt{(\rho)}$$

where $x^{(d)}[n]$=IDFT{$X_k e^{j\Phi_k^{(d)}}$}, $s^{(d)}[n]$=IDFT{$S_k^{(d)}$}, and n∈{0, 1, ..., N−1}. In an embodiment, an efficient algorithm for computing the inverse discrete Fourier transform (IDFT) may be implemented, such as an inverse fast Fourier transform (IFFT), for example.

The above description indicates that, in an embodiment, transmitter 300 includes a number of phase shifters 304, a number of SPS/scaling factor combiners 330, a number of data/SPS combiners 308, and a number of FD-to-TD transformers 310 that is equal to the candidate number quantity, D, and that these transmitter elements are adapted to generate a same number, D, of phase shifted input data signals 328, scaled SPS 334, combined signals 340, and candidate signals 342, respectively. In other embodiments, transmitter 300 may include more or fewer than the candidate number quantity, D, of phase shifters 304, SPS/scaling factor combiners 330, data/SPS combiners 308, and/or FD-to-TD transformers 310, and/or some or all of these transmitter elements may be adapted to generate more or fewer than the candidate number quantity, D, of phase shifted input data signals 328, scaled SPS 334, combined signals 340, and/or candidate signals 342, respectively. Although the number of phase shifters 304, SPS/scaling factor combiners 330, data/SPS combiners 308, and/or FD-to-TD transformers 310 may be the same, in an embodiment, in other embodiments, the numbers of these transmitter components 304, 330, 308, 310 and/or signals 328, 334, 340, 342 may be different. For example, but not by way of limitation, data/SPS combiners 308 may combine a same phase shifted input data signal 328 with multiple scaled SPS 334 or data/SPS combiners 308 may combine a same scaled SPS 334 with multiple phase shifted input data signals 328, in various embodiments. In other embodiments, some signals may be disregarded when, for example, they fail to meet certain criteria and/or threshold levels, which ultimately may result in fewer than the candidate number quantity, D, of candidate signals 342 being provided to signal selector 312. Accordingly, embodiments of the inventive subject matter are not limited to there being a same number, D, of transmitter components 304, 330, 308, 310 and/or signals 328, 334, 340, 342.

FD-to-TD transformers 310 provide the plurality of candidate signals 342 to signal selector 312. In an embodiment, signal selector 312 includes computational apparatus adapted to determine peak-to-average ratios (PARs) for some or all of the candidate signals 342, and based on the PARs, to identify a selected signal 346 from the candidate signals 342.

As used herein, the term peak-to-average ratio (PAR) means a measurement of a waveform that equals the peak amplitude of the waveform divided by the root mean squared (RMS) or time averaged value of the waveform. Although PAR reduction is discussed extensively herein, embodiments also apply to peak-to-average power ratio (PAPR) reduction, and use of the term PAR herein is intended to include at least PAR and PAPR. PAR is a metric that facilitates an assessment of the dynamic range of a signal, and a signal with a low PAR may be preferable, because it may allow the power amplifier 316 to operate at higher power efficiencies without substantial signal distortion. In an embodiment, the PAR for each of the candidate signals 342 may be calculated according to the following equation:

$$PAR\{y^{(d)}[n]\} = \frac{\max_n |y^{(d)}[n]|^2}{E[|y^{(d)}[n]|^2]}.$$ (Equation 4)

In an embodiment, signal selector 312 performs a next step of a selected mapping (SLM) process, which is a PAR reduction tool that may reduce the PAR of OFDM symbols by multiple decibels (dBs). In a particular embodiment, signal selector 312 is adapted to identify the selected signal 346 as the candidate signal 342 with the lowest PAR. A selected mapping (SLM) index, $\tilde{d}$, of the candidate signal 342 with the lowest PAR may be determined, in an embodiment, according to the following equation:

$$\tilde{d} = \min_d PAR\{y^d[n]\}.$$ (Equation 5)

In accordance with an embodiment, PAR reduction is achieved by using D candidate signals 342, and selecting the candidate signal 342 with the lowest PAR. In another embodiment, additional PAR reduction is achieved based on the design of the SPS 330, as will be described in more detail later. More particularly, when IDFT$\{S_k^{(d)}\}=s^{(d)}[n]$ has low PAR, the combined sequence of $y^{(d)}[n]=x^{(d)}[n]\sqrt{(1-\rho)}+s^{(d)}[n]\sqrt{(\rho)}$ may, on average, have a lower PAR than $x^{(d)}[n]$. The extent of PAR reduction is related to the magnitude of the embedding factor, $\rho$. When the embedding factor is increased, PAR reductions also are increased. In an embodiment, the SPS 330 are designed to have a relatively low PAR (e.g., PAR<0.5 dB). In a particular embodiment, the SPS 330 are designed with arbitrary power spectral densities (PSD) using a convex optimization algorithm, as will be described in more detail later.

In order for the receiver (e.g., receiver 114, FIG. 1) to recover the input data symbol 320, $X_k$ (e.g., to determine an estimate, $\hat{X}_k$, of the input data symbol), the receiver should have knowledge of or estimate the SLM index, $\tilde{d}$. In an embodiment, the receiver has knowledge of possible values for $S_k^{(d)}$ and $\phi_k^{(d)}$ in the form of one or more tables that are accessible to (e.g., stored at) the receiver (e.g., receiver 114), where those tables correspond to the phase shift value table and the SPS table accessible to the transmitter 300. Accordingly, when the receiver has knowledge of SLM index, $\tilde{d}$, it may recover the input data symbol 320, $X_k$. Embodiments of methods and apparatus for a receiver to obtain knowledge of the SLM index, $\tilde{d}$ (e.g., to recover the SLM index, $\tilde{d}$, or to determine an estimate $\hat{\tilde{d}}$ of the SLM index) will be discussed in more detail below, in conjunction with FIG. 5. Basically, embodiments achieve blind phase sequence detection without time and/or frequency synchronization, and/or a priori knowledge of the channel.

Up-converter 314 receives the selected signal 346, and is adapted to perform a frequency up-conversion and digital-to-analog conversion process on the selected signal 346 in order to convert the selected signal from a baseband or intermediate frequencies (IF) to the radio frequency (RF) band. The analog up-converted signal 350 is then amplified by power amplifier 316 to produce an amplified signal 352. Power amplifier 316 may add non-linear distortion to the amplified signal 352. Accordingly, in an embodiment, transmitter 300 may include a feedback loop adapted to analyze the amplified signal 352 and to apply digital pre-distortion to the input data, although this is outside the scope of the present application and is not depicted in FIG. 3. The amplified signal 352 is converted to an analog RF signal 360 and transmitted over the channel (e.g., channel 106, FIG. 1) by antenna 318. Unlike some traditional techniques, the analog RF signal 360 may be transmitted without a preamble, and the embedded synchronization/pilot sequence information provides a way for a receiver robustly to synchronize with a channel-affected version of the transmitted signal, as will be described in detail in conjunction with FIG. 5.

Figure 4:
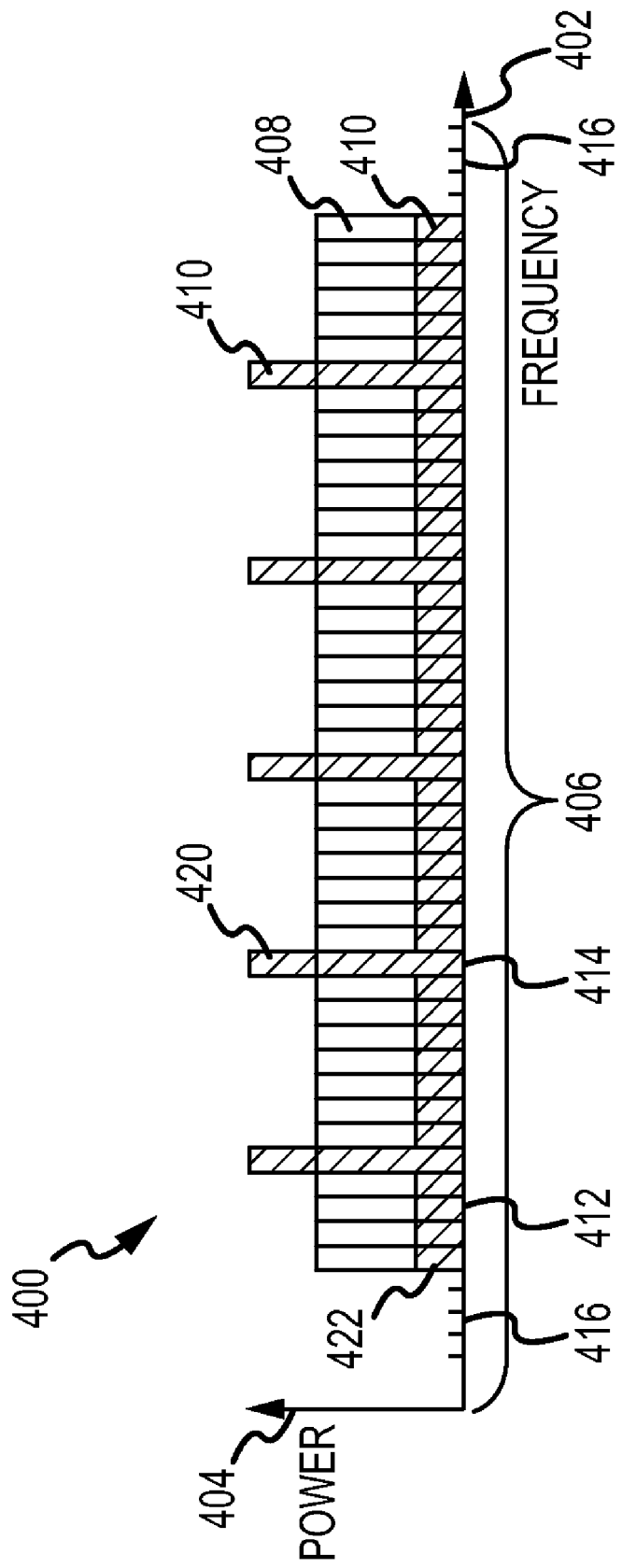
FIG. 4 is an example of a frequency-domain representation of a transmitted signal, in accordance with an example embodiment.

FIG. 4 is an example of a frequency-domain representation of a transmit signal 400, in accordance with an example embodiment. Axis 402 represents frequency, and axis 404 represents signal power (e.g., in dB). An embodiment is implemented in a pilot symbol assisted modulation (PSAM) OFDM system with null edge sub-carriers. Embodiments may, alternatively, be implemented in other types of systems, although such other systems are not discussed in detail herein. Within frequency band 406, the transmit signal 400 includes a data component 408 and an SPS component 410, which are modulated onto a plurality, N, of sub-carriers. More particularly, the subcarriers occupied by the data component 408, $X_k$, of the transmit signal 400, may be decomposed into several non-overlapping parts: 1) data-bearing subcarriers 412, which may be denoted by a set of indices $K_d$; pilot subcarriers 414, which may be denoted by a set of indices $K_p$; and null edge subcarriers 416, which may be denoted by the set of indices $K_n$. In an embodiment, $X_{k \notin K_d} = 0$, so that the data component 408 of the transmit signal 400 only contains energy in data-bearing subcarriers 412. Null edge subcarriers 416 may be constrained, in an embodiment, to zero to limit the amount of spectral regrowth that may encroach on neighboring channels. Pilot signals 420 may be defined as part of the SPS (e.g., SPS 332, FIG. 3 and SPS 538, FIG. 5). The subcarriers occupied by the SPS component 410 of the transmit signal 400, may be decomposed into the same non-overlapping parts as the data component 408, or more particularly: 1) synchronization subcarriers 412, $K_d$; pilot subcarriers 414, $K_p$; and null edge subcarriers 416, $K_n$. These signal segmentations may be summarized as Table 1, below:

TABLE 1

|       | $k \in K_d$ | $k \in K_p$ | $k \in K_n$ |
|-------|-------------|-------------|-------------|
| $X_k$ | $\neq 0$    | $= 0$       | $= 0$       |
| $S_k$ | $\neq 0$    | $\neq 0$    | $= 0$       |
| $Y_k$ | $\neq 0$    | $\neq 0$    | $= 0$       |

Although fifty-one total sub-carriers (e.g., N=51), thirty-eight data-bearing subcarriers 412, five pilot subcarriers 414, and eight null edge sub-carriers 416 are illustrated in FIG. 4, these numbers are used for example purposes only, and more or fewer total sub-carriers, data-bearing subcarriers 412, pilot subcarriers 414, and/or null edge sub-carriers 416 may be utilized, in other embodiments.

SPS component 410 includes synchronization sequence information 422 conveyed within synchronization subcarriers 412 (e.g., data-bearing subcarriers 412), and a plurality of pilot signals 420 conveyed within pilot subcarriers 414, in an embodiment. Because at least some of the synchronization subcarriers 412 occupied by the SPS component 410 are the same as the data-bearing subcarriers 412 occupied by the data component 408, the synchronization sequence information 422 (and thus the SPS component 410) may be considered to be "embedded" within the data component 408. Embodiments of methods for generating SPS components 410 will be described in more detail later in conjunction with FIG. 6.

Pilot signals 420 (or pilot subcarriers 414) have constant power and are evenly spaced (e.g., a same number of data-bearing subcarriers 414 exist between consecutive pilot subcarriers 414), in an embodiment. In alternate embodiments, the positioning and spacing of pilot signals 420 may be different from that illustrated in FIG. 4. In a particular embodiment, the pilot subcarrier 414 spacing is less than the number of null edge subcarriers (e.g., $N/|K_p| > |K_n|$), which may result in a relatively small channel estimation mean square error (MSE). The amount of power in pilot subcarriers 414 may be quantified according to the equation:

$$\beta = \frac{\sum\limits_{k \in K_p} |S[k]|^2}{\sum\limits_{k \in K_p \cup K_d} |S[k]|^2}, \qquad \text{(Equation 6)}$$

which is the ratio of pilot power to the total SPS power.

Referring also to FIG. 3, in the frequency domain, transmit signal 400 may be represented according to the equation:

$$Y_k = X_k \sqrt{1-\rho} + S_k \sqrt{\rho}, \qquad \text{(Equation 7)}$$

where $X_k$ represents and input data symbol 320, $S_k$ represents an SPS 332, $\sqrt{1-\rho}$ represents a first scaling factor 322, and $\sqrt{\rho}$ represents a second scaling factor 330. As mentioned previously, because the first and second scaling factors 322, 330 have an inverse relationship, the value of the embedding factor, $\rho$, dictates how much relative signal power is allocated to the data component 408, $X_k$, of the transmit signal 400 as opposed to the SPS component 410, $S_k$, of the transmit signal 400.

In an embodiment, the embedding factor, $\rho$, has a fixed value, and accordingly the first scaling factor 322 and the second scaling factor 330 also have fixed values. In another embodiment, the transmitter 300 may adjust the value of the embedding factor dynamically. When the embedding factor is increased, the relative power of the SPS component 410 with respect to the data component 408 also will increase. This may be desirable, for example, when the channel is relatively harsh, and increased PAR reductions are desired. However, a tradeoff to increasing the embedding factor (and thus increasing PAR reductions) may be that, as a harsh channel improves (e.g., becomes less harsh), the receiver may have more than enough channel SNR to demodulate, although the received signal SNR may be limited by the distortion induced by the power amplifier 316. In an embodiment, the receiver may feed back information back to the transmitter 300, which indicates the receiver demodulation performance, and thus that the transmitter 300 may increase D and/or $\rho$. Such increases may enable transmitter 300 further to reduce PAR and to minimize the probability of distortion to the transmitted signal that may be induced by the non-linear power amplifier 316. Alternatively, when the embedding factor is decreased, the relative power of the SPS component 410 with respect to the data-bearing component 408 also will decrease. Decreasing the embedding factor may be desirable, for example, when the power amplifier 316 is not inducing significant distortion onto the transmitted signal, and when the demodulation performance of the receiver (e.g., as indicated through feedback from the receiver) is not significantly limited by power amplifier induced distortions and/or by channel multi-path induced distortion, provided that sufficient synchronization performance may still be achieved. However, decreasing the embedding factor may result in smaller PAR reductions. In still another embodiment, the value of the embedding factor may be set to 0, and/or data/scaling factor combiner 302 and SPS/scaling factor combiners 306 may be disabled. In that case, transmit signal 400 will include only a data component 408, as the power of any SPS component 410 effectively will have been reduced to zero. In such an embodiment, a preamble (not illustrated) may be transmitted along with the data in order to facilitate synchronization with the signal at the receiver.

Figure 5:
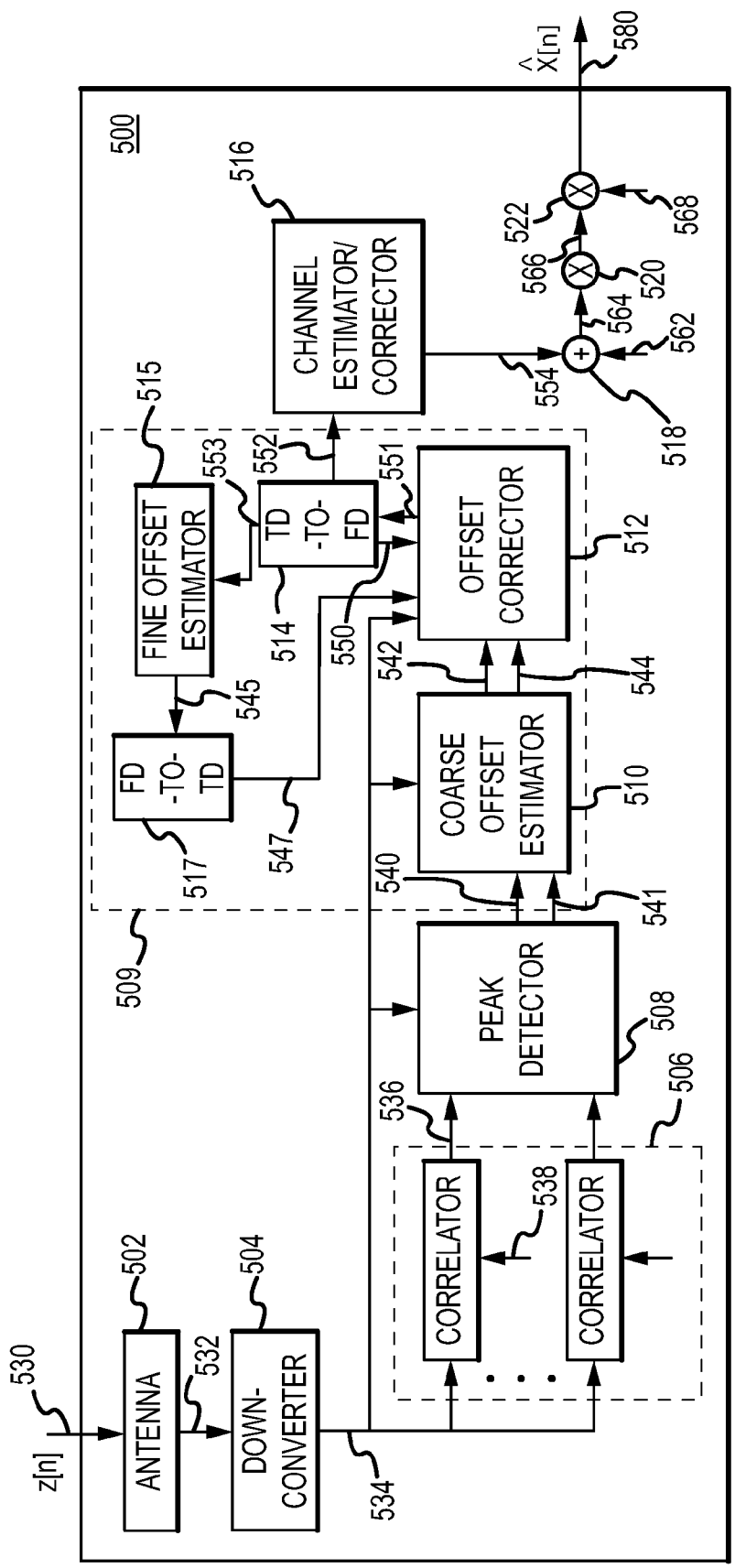
FIG. 5 is a simplified block diagram of a receiver, in accordance with an example embodiment.

FIG. 5 is a simplified block diagram of a receiver 500, in accordance with an example embodiment. Receiver 500 includes an antenna 502, a down-converter 504, a plurality of correlators 506, a peak detector 508, offset estimator/corrector 509, a channel estimator/corrector 516, an SPS removal element 518, scaling element 520, and a phase shift element 522 operatively coupled together as illustrated in FIG. 5, in an embodiment. As will be described in detail below, receiver 500 includes a conjugate correlation receiver, which is adapted to perform a blind phase sequence detection method, in which the receiver 500 may exclude the traditional processes of performing time or frequency synchronization, and in which the receiver 500 may not have a priori knowledge of the channel characteristics.

Antenna 502 is adapted to receive a wireless RF signal 530 from the channel, and to produce an analog RF signal 532. As discussed in detail above, the wireless RF signal 530 represents a channel-affected version of a selected signal that includes a data signal combined with an SPS. Down-converter 532 is adapted to perform an analog-to-digital conversion and a frequency down-conversion process on the analog RF signal 532, in order to produce an IF or baseband received signal 534. Essentially, the received signal 534 represents a channel-affected version of a selected signal (e.g., selected signal 346, FIG. 3) that was transmitted by a transmitter (e.g., transmitter 300, FIG. 3) over a channel. The received signal 534 may be represented by the following equation:

$$z^{(d)}[n] = (f_{PA}(y^{(d)}[n-n_0]) * h[\tau])e^{-j2\pi\epsilon/N} + \eta[n], \quad \text{(Equation 8)}$$

where $f_{PA}(\cdot)$ represents the power amplifier input-to-output characteristic, which may be assumed to be time-invariant (although the input-to-output characteristic may be time-variant, in other embodiments), $h[\tau]$ represents a multi-path fading component of the channel, $y^{(d)}[n-n_0]$ represents the transmitted signal, $y^{(d)}[n]$, subjected to a TO component, $e^{-j2\pi\epsilon/N}$ represents a CFO component, $\eta[n]$ represents an additive noise component, * is the convolution operator, and $\tilde{d}$ is the SLM index. It is to be noted that any carrier phase shift present between the transmitter and receiver is assumed to be included in the phase of the channel at the receiver.

As will be described in detail below, transmitter 500 is adapted to determine estimated channel perturbations (e.g., multi-path fading, TO, CFO, and/or other signal perturbations) reflected within the received signal 534, to apply corrections to the received signal 534 based on the estimated channel perturbations, and to produce an output data symbol 580 based on the corrected received signal, where the output data symbol 580 represents an estimate of the input data symbol (e.g., input data symbol 320, FIG. 3) that was processed and transmitted by the transmitter.

In an embodiment, estimated channel perturbations are determined by the plurality of correlators 506, the peak detector 508, the offset estimator/corrector 509, and the channel estimator/corrector 516. The plurality of correlators 506 includes computational apparatus adapted to receive the received signal 534, to obtain a plurality of candidate synchronization sequences 538, and to produce a plurality of conjugate correlation (CC) outputs 536, $r^{(d)}[u]$. More particularly, each correlator 506 is adapted to correlate the received signal 534 with a different candidate synchronization sequence 538, $s^{(d)}[n]$.

In an embodiment, the candidate synchronization sequences 538 include time-domain versions of the same synchronization/pilot sequences (e.g., SPS 332, FIG. 3) as were combined by the transmitter (e.g., transmitter 300, FIG. 3) with the phase shifted input data (e.g., phase shifted input data 328, FIG. 3). As mentioned previously, both the transmitter (e.g., transmitter 300) and the receiver 500 each may have knowledge of the candidate SPS by each having access to substantively identical tables of SPS, although the transmitter's SPS table may include SPS represented in the frequency domain, and the receiver's SPS table may include the same SPS represented in the time domain, in an embodiment.

The plurality of conjugate correlation outputs 536 may be represented by the equation:

$$r^{(d)}[u] = CC\{s^{(d)}[n], z^{(d)}[n-u]\}, \quad \text{(Equation 9)}$$

where the conjugate correlation between two length-N sequences may be defined as:

$$CC\{a[n], b[n]\} = \quad \text{(Equation 10)}$$
$$\left(\sum_{n=0}^{(N/2)-1} a^*[n]b[n-u]\right) \cdot \left(\sum_{n=N/2}^{N-1} a^*[n]b[n-u]\right)^*.$$

where $(\cdot)^*$ is the conjugate operation.

In an embodiment, the number of conjugate correlation outputs 536 produced equals the candidate number quantity D, although the number of conjugate correlation outputs 536 may be different, in other embodiments.

In an embodiment, the received signal 534 may be divided into a plurality of subcode sequences in order to reduce the number of operations associated with performing the correlation process. In such an embodiment, each conjugate correlation output 536 may be produced, by generating a sub-correlation for each subcode sequence, and summing together the sub-correlations to form a summed result having a single correlation peak.

Correlators 506 provide the plurality of conjugate correlation outputs 536 to peak detector 508. In an embodiment, correlators 506 may not provide (or peak detector 508 may not evaluate) those of the plurality of conjugate correlation outputs 536 that have correlation peaks below a threshold. Peak detector 508 includes computational apparatus adapted to determine an estimate of the SLM index 540, $\hat{d}$, based on the conjugate correlation outputs 536. In an embodiment, the SLM index estimate 540 is determined according to the equation:

$$\hat{d} = \underset{d}{\operatorname{argmax}} |r^{(d)}[u]|. \quad \text{(Equation 11)}$$

Accordingly, the SLM index estimate 540 corresponds to the conjugate correlation output 536 that represents a highest correlation peak. Unlike traditional methods, embodiments include blind phase sequence detection criterion (e.g., no side information representing the SLM index is transmitted) in order to determine the SLM index estimate 540, and the SLM index estimate 540 is determined based on the conjugate correlations between the received signal 534 and the candidate synchronization sequences 538. Correct detection of $\tilde{d}$ may depend on the magnitude of the peaks of $|r^{(d)}[u]|$ for $d \neq \tilde{d}$, also referred to herein as "spurious correlation peaks." When the spurious correlation peaks all are less than the peak in $|r^{(\tilde{d})}[u]|$, $\tilde{d}$ may be correctly detected (e.g., $\hat{d} = \tilde{d}$). In an embodiment, and as will be described in more detail later, the candidate SPS 538 are designed so that the spurious correlation peaks are low. In a particular embodiment, the candidate SPS 538 are designed so that:

$$|\max CC\{s^{(d)}[n], s^{(d)}[n-u]\}| < th_{self}, \quad \text{(Equation 12)}$$

where $th_{self}$ is a threshold that provides adequate system performance. Peak detector 508 provides the SLM index estimate 540, $\hat{\hat{d}}$, to offset estimator/corrector 509 (or more particularly to coarse offset estimator 510), along with the $\hat{\hat{d}}$ th conjugate correlation output 541 (although this may be obtained from elsewhere, as well).

Offset estimator/corrector 509 includes a coarse offset estimator 510, an offset corrector 512, a time domain-to-frequency domain (TD-to-FD) transformer 514, a fine offset estimator 515, and a frequency domain-to-time domain (FD-to-TD) transformer 517, in an embodiment. Coarse offset estimator 510 includes computational apparatus adapted to determine a plurality of channel perturbations, including coarse timing offset (TO) estimates 542 and coarse carrier frequency offset (CFO) estimates 544.

In an embodiment, coarse offset estimator 510 is adapted to determine a coarse timing offset estimate 542, $\hat{n}_0$, according to the equation:

$$\hat{n}_0 = \arg\max_u \left| r^{(\hat{d})}[u] \right|. \quad \text{(Equation 13)}$$

Accordingly, the coarse timing offset estimate 542 is determined based on the maximum of the $\hat{\hat{d}}$ th conjugate correlation output. Assuming that $\hat{\hat{d}}=\tilde{d}$, the coarse timing offset estimate should be determined (or "detected") correctly as long as $|r^{(\tilde{d})}[n_0]| > r^{(\tilde{d})}[n]$ form $n \neq n_0$.

In an embodiment, coarse offset estimator 510 also is adapted to determine a coarse estimate of the carrier frequency offset (CFO) 544, $\hat{\epsilon}$, according to the equation:

$$\hat{\epsilon} = \text{angle}\left( r^{(\hat{d})}[\hat{n}_0] \right). \quad \text{(Equation 14)}$$

Essentially, the coarse CFO estimate is determined as the phase of the conjugate correlation output 536 that was determined by peak detector 508 to have the highest correlation peak.

In an embodiment, the coarse offset and estimator 510 provides the estimated channel perturbations (e.g., coarse timing offset estimates 542 and coarse CFO estimates 544) to offset corrector 512. Offset corrector 512 includes computational apparatus adapted to receive the received signal 534 and the estimated channel perturbations, and to effectively compensate for those estimated channel perturbations in the received signal 534 by aligning the received signal 534 on a symbol boundary using the coarse timing offset estimate 542 and the coarse CFO estimate 544, which may include removing the cyclic extension from the received signal 534. In an embodiment, offset corrector 512 produces a coarsely-corrected signal 550.

Once the coarse timing and carrier frequency offsets are removed, the coarsely-corrected signal 550 may be transformed to the frequency domain by time domain-to-frequency domain (TD-to-FD) transformer 514, which includes computational apparatus adapted to perform a time domain-to-frequency domain transformation on the corrected signal 550, in order to produce a frequency-domain, coarsely-corrected signal 553. The time domain-to-frequency domain transformation may include a Fourier transform (FT) or, more particularly, a fast Fourier transform (FFT), in various embodiments, although other types of time domain-to-frequency domain transformations may be performed in other embodiments.

In an embodiment, fine offset estimation may then be performed using fine offset estimator 515. In an embodiment, fine offset estimator 515 determines a fine CFO estimate, which is applied to the coarsely-corrected signal 550 by offset corrector 512. In an embodiment, fine offset estimator 515 determines a fine CFO estimate, $\hat{\epsilon}$, using the pilot signals (e.g., pilot signals 420, FIG. 4) within the frequency-domain, coarsely-corrected signal 553. In an embodiment, this includes estimating the phase of each pilot signal (e.g., pilot signals 420), and determining the phase change in any particular pilot signal from OFDM symbol to OFDM symbol. Thus, the fine CFO estimate may be determined using the common sub-carrier phase difference between OFDM symbols, which may then be averaged across all pilot sub-carriers to minimize estimation variance.

The frequency domain pilot part of the received signal for two consecutive sets of pilot symbols may be approximated as $Y_{k1}^P = X_{k1}^P H_{k1}^P e^{-j2\pi\epsilon'_1/N}$ and $Y_{k2}^P = X_{k2}^P H_{k2}^P e^{-j2\pi\epsilon'_2/N}$, respectively. The phases $\phi_{k1}$ and $\phi_{k2}$, may be computed as $\angle Y_{k1}^P$ and $\angle Y_{k2}^P$ (where $\angle$ represents the angle), respectively. Then, the fine CFO estimate, may be determined according to the equation:

$$CFO = \frac{1}{2\pi T_s} \sum_{k=0}^{|K_{pi}-1|} (\phi_{k1} - \phi_{k2}). \quad \text{(Equation 15)}$$

Fine offset estimator 515 may provide the fine CFO estimate to offset corrector 512 via a feedback path (not illustrated). In addition, fine offset estimator 515 provides a feedback version 545 of the frequency-domain, coarsely-corrected signal to offset corrector 512 via frequency domain-to-time domain (FD-to-TD) transformer 517, which transforms the feedback version 545 of the coarsely-corrected signal into the time domain to produce a time-domain, fed back, coarsely-corrected signal 547. In an alternate embodiment, the coarsely-corrected signal 550 is retained in memory, and is not fed back to offset corrector 512. Either way, offset corrector 512 applies the fine CFO estimate to the coarsely-corrected signal (either signal 550 or 547) to reproduce the finely-corrected signal 551. In an alternate embodiment, fine CFO correction may be performed in the frequency domain after fine offset estimator 515, rather than performing the fine CFO correction in the time domain by offset corrector 512.

In a further embodiment, fine offset estimator 515 also may determine a fine timing offset estimate and/or a carrier phase offset estimate. For example, fine offset estimator 515 may determine a fine timing offset estimate based on the phase slope between pilot sub-carriers common to each OFDM symbol, which also can be averaged over all symbols. Fine offset estimator 515 may determine a carrier phase offset estimate from the mean value of the phase slope in each OFDM symbol, in an embodiment.

When a fine timing and/or carrier phase offset are estimated, fine offset estimator 515 provides the fine timing and/or carrier phase offsets to channel estimator/corrector 516, in an embodiment, for correction of the fine timing and/or carrier phase offset in the frequency domain. In an alternate embodiment, fine offset estimator 515 may provide the fine timing and/or carrier phase offsets, if estimated, to offset corrector 512 for correction in the time domain.

Either way, the finely-corrected signal 551 is transformed to the frequency domain by TD-to-FD transformer 514, and the resulting corrected signal 552 is provided to channel estimator/corrector 516. Channel estimator/corrector 516 receives the corrected signal 552, determines a channel estimate, and based on the channel estimate, proceeds to equalize the channel effects in the corrected signal 552 to produce an equalized combined signal 554. Channel estimator/corrector 516 is adapted to determine a channel estimate, $\hat{H}_k$ based on the corrected signal 552. In an embodiment, the channel estimate is determined by generating a first quantity according to the equation:

$$W_k^{(\hat{d})} = \text{IDFT}\{z^{(\hat{d})}[n+\hat{n}_0]\}e^{j2\pi\hat{\epsilon}/N}, \quad \text{(Equation 16)}$$

which yields $W_k^{(\hat{d})} = Y_k^{(\hat{d})} H_k + \eta_k + \delta_k + \iota_k$, where $\delta_k$ is the distortion noise caused by the power amplifier (e.g., power amplifier 316, FIG. 3), $\iota_k$ is the inter-carrier interference, and $H_k$ and $\eta_k$ are the IDFTs of h[n] and η[n], respectively. From $W_k^{(\hat{d})}$, channel estimator/corrector 516 may estimate the channel in the pilot subcarriers (e.g., pilot subcarriers 414, FIG. 4) according to the equation:

$$\hat{H}_k = \frac{W_k^{(\hat{d})}}{S_k^{(\hat{d})}\sqrt{\rho}}, k \in K_p. \quad \text{(Equation 17)}$$

In an embodiment, channel estimator/corrector 516 may interpolate the pilot subcarrier channel estimates to the data-bearing subcarriers (e.g., data-bearing subcarriers 412, FIG. 4), $k \in K_d$ so that $\hat{H}_k$ is defined for $k \in K_d \cup K_p$.

In an alternate embodiment, assumptions may be made that all of the synchronization works perfectly (e.g., $\hat{d}=\tilde{d}$, $\hat{n}_0=n_0$, and $\hat{\epsilon}=\epsilon$) and that no distortion noise is introduced by the transmitter power amplifier (e.g., power amplifier 316, FIG. 3). With those assumptions, the first quantity represented in Equation 16, above, may be simplified to:

$$W_k^{(\hat{d})} = Y_k^{(\hat{d})} H_k + \eta_k, \quad \text{(Equation 18)}$$

where $\eta_k \sim CN(0, \sigma_\eta^2)$. Using these assumptions and the first order approximation that $E[|\eta_k|^2|\hat{X}_k|^2 H_k] \approx \sigma^2$ for $k \in K_d$, the symbol estimate MSE may be determined according to the equation:

$$E[|\hat{X}_k - X_k|^2 | H_k] \approx \frac{\sigma^2}{|H_k|^2} \cdot \left( \frac{\frac{(1-\beta)|K_p|}{\beta(1-\rho)|K_d|} +}{\frac{|K_p|}{\beta\rho|K_d|} +} \frac{1}{1-\rho} \right) \quad \text{(Equation 19)}$$

As Equation 19 indicates, the MSE is dependent on the ratio of pilot to data subcarriers $|K_p|/|K_d|$. Also, the minimizing the pilot subcarrier power is achieved by setting β=1 when perfect synchronization is assumed. However, in an embodiment, β is selected such that β<1, in order to achieve desired synchronization performance.

Channel estimator/corrector 516 may then generate an equalized combined signal 554 by equalizing the channel effects based on the channel estimate. After the various offset and channel corrections, the equalized combined signal 554 may be represented as:

$$z^{(\hat{d})}[n] = ((f_{PA}(y^{(\hat{d})}[n-n_0]) * h[\tau])e^{-j2\pi\epsilon/N} + \eta[n])e^{j2\pi\hat{\epsilon}/N}. \quad \text{(Equation 20)}$$

SPS removal element 518 includes computational apparatus adapted to receive the equalized combined signal 554, and to remove the scaled SPS 562 corresponding to the SLM index estimate 540 from the equalized combined signal 554 (e.g., to combine $-\sqrt{\rho}s_k^{(\hat{d})}$ with the equalized combined signal 554) in order to produce an estimated, phase shifted data signal 564. In an embodiment, the scaled SPS 562 may be obtained by retrieving the SPS $s_k^{(\hat{d})}$ corresponding to the SLM index estimate 540 from a table of SPS, which is accessible to or stored in receiver 500, and by applying the scaling factor $\sqrt{\rho}$ to the retrieved SPS. The SPS table includes one or more pre-generated sets of SPS, where each SPS in a set may be referenced by an SLM index. Each SPS in the receiver's SPS table is represented in the frequency domain, in an embodiment. Embodiments of methods for generating sets of SPS will be described in more detail later in conjunction with FIG. 6. Scaling element 520 is adapted to apply a scaling factor to the estimated, phase shifted data signal 564, in order to produce a scaled, phase shifted data signal 566, which has a peak amplitude approximately equal to that of the original input data, X[n]. Phase shift element 522 includes computational apparatus adapted to phase shift the scaled, phase shifted data signal 566 by a phase shift value 568 corresponding to the SLM index estimate 540 (e.g., to shift the scaled, phase shifted data signal 566 by $$e^{-j\phi(\hat{d})}$$

The remaining signal is demodulated in order to produce the output data symbol 580, $\hat{X}_k[n]$. When the SLM index estimate 540 represents a correctly-detected SLM index (e.g., an SLM index corresponding to the selected signal 346, FIG. 3, identified at the transmitter 300), then blind phase sequence detection has been robustly performed by receiver 500, and the output data symbol 580 reflects an accurate estimate of the input data symbol (e.g., input data symbol 320, FIG. 3).

As discussed in detail above, both a transmitter (e.g., transmitter 300, FIG. 3) and a receiver (e.g., receiver 500, FIG. 5) have access to at least one set of pre-generated SPS. Embodiments include methods for generating sets of SPS that result in significant PAR reductions and that have comparable synchronization and channel estimation properties, when compared with traditional methods.

According to an embodiment, generating an SPS that results in significant PAR reductions are achieved when IDFT$\{S_k^{(d)}\} = s^d[n]$ has low PAR. In this case, the combined sequence $y^{(d)}[n] = \sqrt{\rho}s^{(d)}[n] + \sqrt{1-\rho}x^{(d)}[n]$ may, on average, have lower PAR than $x^{(d)}[n]$. The magnitude of PAR reduction depends on the value of the embedding factor, ρ, where larger PAR reductions may be achieved when ρ has a relatively large value (e.g., when ρ>0.6), and smaller PAR reductions may be achieved when ρ has a relatively small value (e.g., when ρ<0.6). In an embodiment, a value for ρ may derived assuming perfect acquisition by minimizing the maximum symbol estimate in $E\lfloor|x_d|^2\rfloor$, or $MSE_x$, where $MSE_x = E[|\hat{X}_d - X_d|^2]$. Using various embodiments, an SPS may be generated to have a PAR <0.5 dB, although embodiments may be implemented in which an SPS has a PAR ≧0.5 dB, as well.

In addition, SPS generated according to an embodiment may have excellent synchronization properties. As discussed previously, synchronization includes estimating the SLM index, $\hat{d}$, for the transmitted signal, estimating a coarse timing offset, $n_0$, and estimating a coarse CFO, $\hat{\epsilon}$. An estimation of which phase sequence index, $\tilde{d}$, was transmitted may be made via criterion specified in Equation 11, above. From Equation 11, it is apparent that correct estimation of $\tilde{d}$ depends on the peaks of $|r^{(d)}[u]|$ for $d \neq \tilde{d}$ (i.e., spurious correlation peaks). When the spurious correlation peaks all are less than the peak in $|r^{(\tilde{d})}[u]|$, $\tilde{d}$ will be correctly detected. Accordingly, in an embodiment, sets of SPS are generated so that spurious correlation peaks are low, when compared with the peak in $|r^{(\tilde{d})}[u]|$.

Assuming that $x^{(d)}[n]$ is independent of $s^{(d)}[n]$, the peaks in $|r^{(d)}[u]|$ when $d \neq \tilde{d}$ are dictated by the peaks of the conjugate correlation $CC\{s^d[n], s^q[n]\}$ for $d \neq q$. In an embodiment, a set of SPS is generated so that $\max_{u, d \neq q} CC\{s^d[n], s^q[n-u]\}$ is minimized using an optimization procedure. In an alternate embodiment, a set of SPS may be generated more simply according to the following equation:

$$\left[\max_{u, d \neq q} CC\{s^{(d)}[n], s^{(q)}[n-u]\}\right] < th_{cross}, \quad \text{(Equation 21)}$$

where $th_{cross}$ is a predetermined threshold. More particularly, in an embodiment, $th_{cross}$ is a threshold that is determined to provide adequate system performance by considering an optimal or near-optimal balance between the synchronization detection performance (e.g., a probability of missing a synchronization signal and a probability of falsely detecting a synchronization signal when none is present), the estimation quality (e.g., mean square error (MSE) or other quality estimation quantities) of the timing, frequency, and phase estimation performance for synchronization, the channel estimation performance (e.g., MSE or other channel estimation quantities), and the receiver demodulator bit error rate (BER) performance. In an embodiment, $th_{cross} < 0.1$, although $th_{cross}$ may be equal to or less than 0.1, in other embodiments.

As discussed previously, once $\tilde{d}$ is detected, a coarse timing offset estimate (e.g., coarse timing offset estimate 542), $\hat{n}_0$, may be determined according to Equation 13, above. As Equation 13 indicates, the coarse timing offset estimate is determined based on the maximum of the $\hat{\tilde{d}}$ th conjugate correlation output. Although the channel estimator (e.g., channel estimator/corrector 516, FIG. 5) may compensate for differences $|n_0 - \hat{n}_0| \leq L_{cp} - L_h + 1$, where $L_h$ is the length of the channel and $L_{cp}$ is the length of the cyclic prefix, the SPS are generated, in an embodiment, to minimize this difference. According to Equation 13, above, no is determined based on the maximum of the $\hat{\tilde{d}}$ th conjugate correlation output, and it may be assumed that $\hat{\tilde{d}} = \tilde{d}$, $n_0$ may be detected correctly as long as $|r^{(\tilde{d})}[n_0]| > r^{(\tilde{d})}[n]$ for all $n \neq n_0$. In an embodiment, a set of SPS is generated so that $\max_{d, u \neq n_0} CC\{s^{(d)}[n], s^{(d)}[n-u]\}$ is minimized. In an alternate embodiment, a set of SPS may be generated more simply according to the equation:

$$\left[\max_{d, u \neq n_0} CC\{s^{(d)}[n], s^{(d)}[n-u]\}\right] < th_{self}, \quad \text{(Equation 22)}$$

where $th_{self}$ is a predetermined threshold (e.g., a threshold that is determined to provide adequate system performance). In an embodiment, $th_{self} < 0.1$, although $th_{self}$ may be equal to or less than 0.1, in other embodiments.

Figure 6:
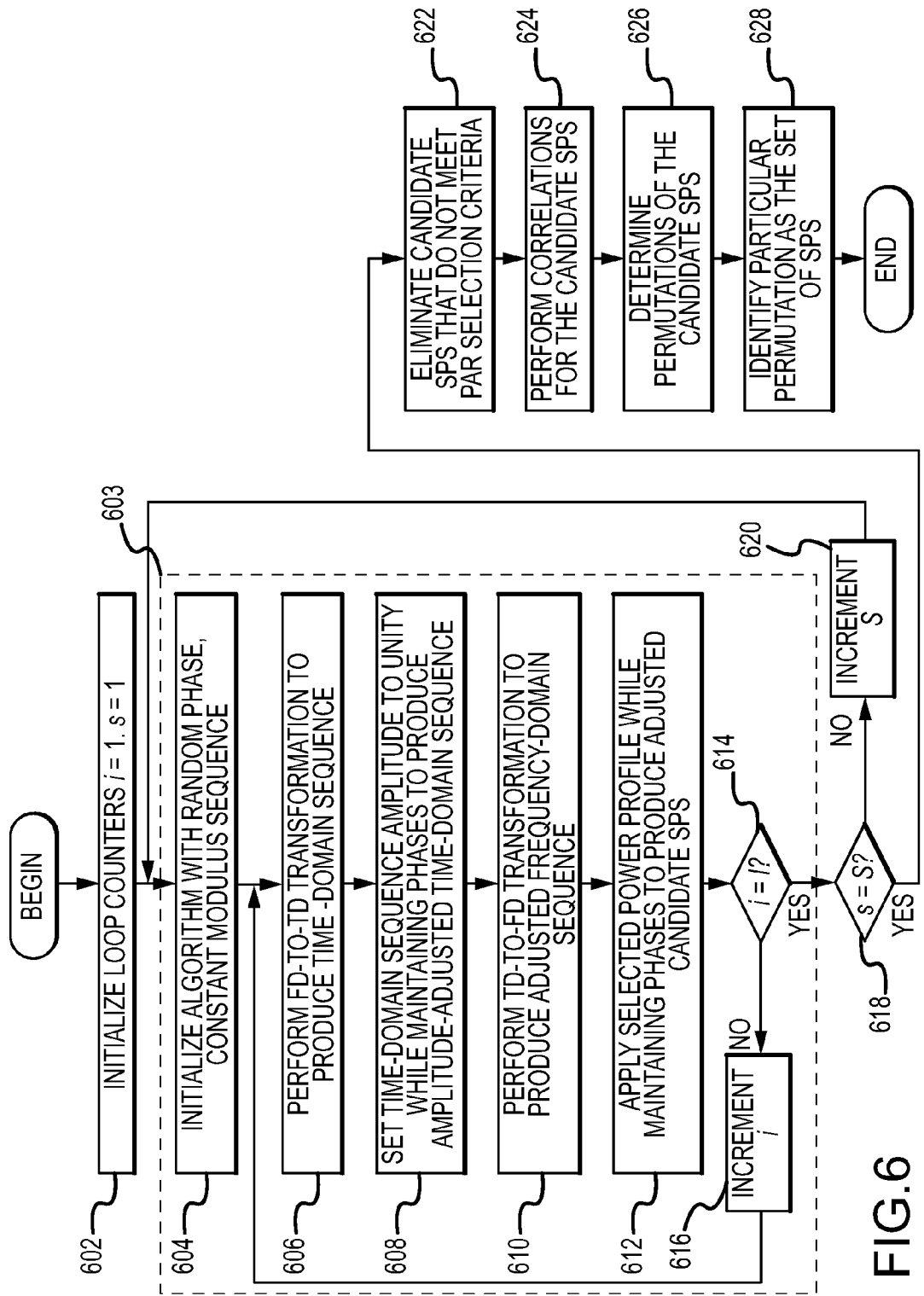
FIG. 6 is a flowchart of a method for generating a set of synchronization/pilot sequences (SPS), in accordance with an example embodiment.

FIG. 6 is a flowchart of a method for generating a set of SPS, according to an example embodiment. The set of SPS may be used, for example, as a set of pre-generated SPS that are accessed by a transmitter (e.g., transmitter 300, FIG. 3) and a receiver (e.g., receiver 500, FIG. 5), as discussed previously in conjunction with FIGS. 3 and 5. A set of SPS may be represented, for example, as $\{s^{(d)}[n]\}_{d=1}^{D}$, where D is the number of SPS in the set, and d is a relational index that may be correlated, for example, with an SLM index or an SLM index estimate (e.g., SLM index estimate 540, FIG. 5). In an embodiment, the number of SPS in a set, D, is an integer having a value between 2 and 10, although a set of SPS may have more SPS, in other embodiments.

In an embodiment, each SPS in the set is generated by performing multiple iterations of a time-frequency projection (e.g., a Projection onto Convex Sets (POCS) algorithm), or an iterative convergence process based on PAR results and/or mean square error properties. In an embodiment, the number of iterations, I, is an integer having a value between about 100 and 300, although a smaller or larger number of iterations may be performed, in alternate embodiments. The flowchart of FIG. 6 includes an inner loop, which represents an iteration of a time-frequency projection (e.g., the inner loop is performed I times) in order to generate a single SPS, and an outer loop, which is performed S times in order to generate a set of S candidate SPS. Further steps of the method reduce the number of candidate SPS to a set of D SPS (e.g., D<S), as will be explained in detail below.

The method may begin, in block 602, by initializing an inner loop counter, i, and an outer loop counter, s. Inner loop counter, i, indicates a current time-frequency projection iteration being performed for the SPS being generated, and accordingly may be referred to as an iteration counter. In an embodiment, the inner loop counter is initialized to a value of 1 and is incremented by 1 for each iteration being performed up to a value of I, although the inner loop counter may be initialized to some other value, and/or may be incremented differently, or may be a decrementing counter, in alternate embodiments.

Outer loop counter, s, indicates which candidate SPS in a set is being generated, and accordingly may be referred to as an SPS number counter. In an embodiment, the outer loop counter is initialized to a value of 1 and is incremented by 1 for each candidate SPS being generated up to a value of S, although the outer loop counter may be initialized to some other value, and/or may be incremented differently, or may be a decrementing counter, in alternate embodiments.

The group of blocks 603 are executed in order to generate a single candidate SPS. As mentioned previously, generation of a candidate SPS includes using an iterative time-frequency projection algorithm (e.g., a POCS algorithm). For each candidate SPS, the algorithm is initialized using different initial conditions (e.g., a different random phase) from the other candidate SPS that are generated. Accordingly, generation of a candidate SPS may begin, in block 604, by initializing the algorithm by generating an initial, random phase, constant modulus phase sequence, to which a pre-determined power profile is applied. In an embodiment, the random phase is determined by choosing a uniformly generated random phase between 0 and $2\pi$ radians or between $-\pi$ and $\pi$ radians. In an embodiment, the actual generation of the phase may be performed using a uniform random number generator between 0 and 1 inclusive (e.g., denoting as $r_u$), and applying the randomly generated number to a complex phasor of form exp $(j2\pi r_u)$. The power profile that is applied to the phase sequence is determined by computing a desired amplitude for each subcarrier, where the amplitudes for the subcarriers are computed to provide a lowest symbol MSE performance at the receiver, in an embodiment. The power profile is applied by multiplying the desired amplitudes by the subcarrier value generated in the inner loop of FIG. 6 (e.g., in block 604), in order to produce a power-adjusted phase sequence. In an embodiment, the applied power profile is the same for all SPS generated in the set. The length of the frequency-domain sequence is in a range of 32 to 124 values, in an embodiment, although shorter or longer sequences may be generated, in alternate embodiments.

In block 606, a time-domain transformation is performed on the initial, power-adjusted phase sequence to produce a time-domain sequence. The time domain-to-frequency domain transformation may include a Fourier transform or, more particularly, a discrete Fourier transform (DFT), in various embodiments, although other types of time domain-to-frequency domain transformations may be performed in other embodiments.

In block 608, amplitudes of the time-domain sequence are set to unity while maintaining phases of the time-domain sequence to produce an amplitude-adjusted time-domain sequence. More particularly, given that the time domain version may not be unity in amplitude, the sequence is converted to magnitude and phase (i.e., polar form). The magnitude of the converted sequence is set so that the amplitude is unity, while the original phase is retained. The converted sequence is then converted back to real and imaginary (i.e., rectangular form) to produce the amplitude-adjusted time-domain sequence.

In block 610, a frequency-domain transformation is performed on the amplitude-adjusted time-domain sequence to produce an adjusted frequency-domain sequence. The frequency domain-to-time domain transformation may include an inverse Fourier transform or, more particularly, an inverse discrete Fourier transform, in various embodiments, although other types of frequency domain-to-time domain transformations may be performed in other embodiments. In block 612, the power profile is applied to the adjusted frequency-domain sequence while maintaining phases of the adjusted frequency-domain sequence in order to produce an adjusted candidate sequence.

In block 614, a determination is made whether the last iteration has been performed for the candidate SPS being generated (e.g., whether i=I). If not, then the inner loop counter is incremented (e.g., by 1), in block 616, and the method iterates as shown by repeating blocks 606-614 at least an additional time using the adjusted candidate sequence.

When the last iteration has been performed, then the then-current adjusted candidate sequence represents a completed version of a candidate SPS. A determination may then be made, in block 618, whether the last candidate SPS has been generated in the set of candidate SPS (e.g., whether s=S). If not, then the outer loop counter is incremented (e.g., by 1), in block 620, and the method iterates as shown by repeating blocks 604-618 until the last candidate SPS has been generated.

When the last SPS has been generated, a subset of D candidate SPS may be selected, via blocks 622, 624, 626, and 628, which will represent the set of SPS being generated according to the method of FIG. 6. In block 622, certain candidate SPS that were generated via blocks 604-620 may be eliminated from the set of candidate SPS. In an embodiment, candidate SPS are eliminated that do not meet a PAR selection criteria (e.g., a selection criteria based on PAR). For example, in a particular embodiment, the PAR selection criteria may be a PAR threshold, $th_{PAR}$, and those candidate SPS having a PAR value that is greater than (or is equal to or greater than) the PAR threshold may be eliminated from the set of candidate SPS. In other words, when $(\max|s^{(s)}[n]|) > th_{PAR}$ for a candidate SPS, the candidate SPS may be eliminated. A PAR threshold may have a value in a range between about 0 dB and about 2.0 dB, in an embodiment, although the PAR threshold may be smaller or greater than the values within the above-given range, in other embodiments. In other embodiments, an inclusion process (rather than an exclusion process) may be performed, in which those candidate SPS having a PAR value that is less than a PAR threshold may be allowed to remain within the set of candidate SPS. In still another embodiment, block 622 may be excluded altogether from the SPS set generation method.

In block 624, a plurality of correlations are performed among the candidate SPS (e.g., the candidate SPS that remain after block 622) to generate a plurality of correlation values. In a particular embodiment, performing the correlations includes performing a plurality of cross-correlations among the candidate SPS to generate a plurality of cross-correlation results, and also performing a plurality of auto-correlations among the candidate SPS to generate a plurality of auto-correlation results. In an embodiment, $P^2$ cross-correlations are performed, where P is a number of candidate SPS being correlated. In other words, each candidate SPS is correlated with each other candidate SPS in order to generate $P^2$ cross-correlation results. Each cross-correlation result represents a maximum peak for the cross-correlation, and may be represented by $$\max_{\tau \neq 0}|s^{(s)}[n] \otimes s^{(s)}[n+\tau]|.$$

In addition, in an embodiment P auto-correlations are performed (e.g., an auto-correlation for each of the P candidate SPS being correlated), and the secondary maximum peak from each auto-correlation is determined as an auto-correlation result. Accordingly, P auto-correlation results are determined. An auto-correlation result corresponding to the secondary maximum peak may be represented by $\max|s^{(s)}[n] \otimes s^{(q \neq s)}[n+\tau]|$. A desired correlation output typically produces a notable peak, where any secondary peak is very low in comparison. In an embodiment, this correlation property is exploited for the purpose of detecting whether a signal is present. In addition, information at the correlation peak(s) is used to determine parameters such as timing offset and frequency offset, for example. The max cross-correlation results are used to determine at what probability a sequence other than the desired sequence may be chosen, where an inaccurate choice may result in synchronization detection errors and subsequent phase sequence detection errors. The maximum auto-correlation performance results are used to determine at what probability an incorrect peak of the correlation output may be chosen, where an inaccurate choice may result in estimation errors in timing and frequency offset, for example.

In block 626, which may be performed earlier in other embodiments, a plurality of permutations of sets of candidate SPS are determined. In an embodiment, each permutation includes a different combination of D SPS selected from the set of candidate SPS. Permutations may be determined for each possible combination of SPS, although in other embodiments, a smaller number of permutations may be determined.

In block 628, a permutation is identified, from the plurality of permutations, as a selected set of SPS (e.g., the end result of the SPS set generation method). In a particular embodiment, the identified permutation corresponds to the permutation having a smallest maximum max-correlation value (e.g., the set that gives the smallest maximum cross-correlations within the set and/or the smallest secondary peak in the auto-correlations in the set). In an embodiment, identifying the selected permutation from the plurality of permutations includes identifying a permutation that corresponds to a maximum cross correlation threshold and/or a maximum secondary peak of the auto-correlations. In general, a low secondary peak indicates a more definitive result for each auto-correlation, and the same is true for a maximum cross-correlation (e.g., one would desire the maximum peak of the cross-correlation to be as small as possible). After identifying the permutation, the method may then end.

Figure 7:
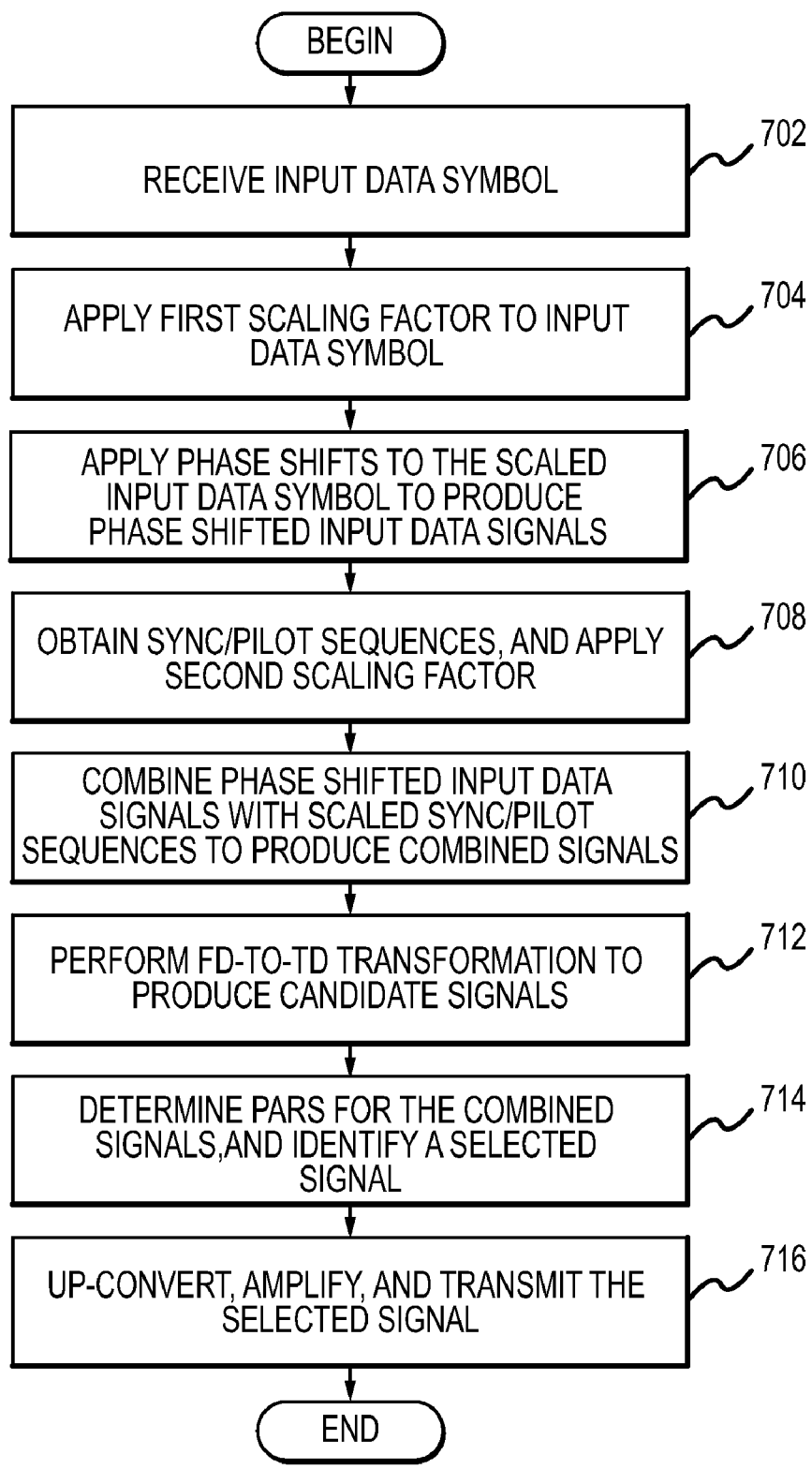
FIG. 7 is a flowchart of a method for generating and transmitting wireless signals that include embedded SPS, in accordance with an example embodiment.

FIG. 7 is a flowchart of a method for generating and transmitting wireless signals that include embedded SPS, in accordance with an example embodiment. Embodiments of the method are only briefly discussed in conjunction with FIG. 7, as various details and alternate embodiments were discussed in more detail above.

Referring also to FIG. 3, the method may begin, in block 702, when a transmitter (e.g., transmitter 300) receives (e.g., by data/scaling factor combiner 302) an input data symbol (e.g., input data symbol 320). In block 704, a first scaling factor (e.g., first scaling factor 322) may be applied to the input data symbol, in order to produce a scaled input data symbol (e.g., scaled input data symbol 324). As discussed previously, the first scaling factor may have a value of $\sqrt{1-\rho}$, where $\rho$ is an embedding factor having an absolute value between 0 and 1. In other embodiments, the first scaling factor may have a different value. In block 706, various different phase shifts (e.g., phase shifts 326) are applied (e.g., by phase shifters 304) to the scaled input data symbol, in order to produce a plurality of phase shifted input data signals (e.g., phase shifted input data signals 328).

In block 708, a plurality of SPS (e.g., SPS 332) are obtained (e.g., a plurality of SPS generated according to an embodiment), and a second scaling factor (e.g., second scaling factor 330) is applied to the plurality of SPS in order to produce a plurality of scaled SPS (e.g., scaled SPS 334). As discussed previously, the second scaling factor may have a value of $\sqrt{\rho}$, in an embodiment, although the second scaling factor may have a different value, in other embodiments. Preferably, but not essentially, the second scaling factor has an inverse mathematical relationship with the first scaling factor (e.g., by varying the value of the embedding factor, as the second scaling factor value increases, the first scaling factor value decreases, and vice versa).

In block 710, each one of the plurality of phase shifted input data signals is combined (e.g., by data/SPS combiners 308) with one of the scaled SPS in order to produce a plurality of combined signals (e.g., combined signals 340). In block 712, a frequency domain-to-time domain transformation is performed (e.g., by FD-to-TD transformers 310) on each of the combined signals, in order to produce a plurality of candidate signals (e.g., candidate signals 342).

In block 714, peak-to-average ratios (PARs) are determined (e.g., by signal selector 312) for some or all of the candidate signals, and based on the peak-to-average ratios, a selected signal (e.g., selected signal 346) is identified from the candidate signals. As discussed previously, the selected signal may be identified as the candidate signal with the lowest PAR, in an embodiment. In block 716, the selected signal is up-converted (e.g., by up-converter 314), amplified (e.g., by power amplifier 316), and transmitted over the channel (e.g., channel 106, FIG. 1). Although not illustrated or discussed herein, those of skill in the art would realize that various other processes for conditioning, filtering, and/or processing the various signals prior to transmission also may be performed at various stages within the process of generating and transmitting the selected signal. Upon transmitting the selected signal, the method may then end.

Figure 8:
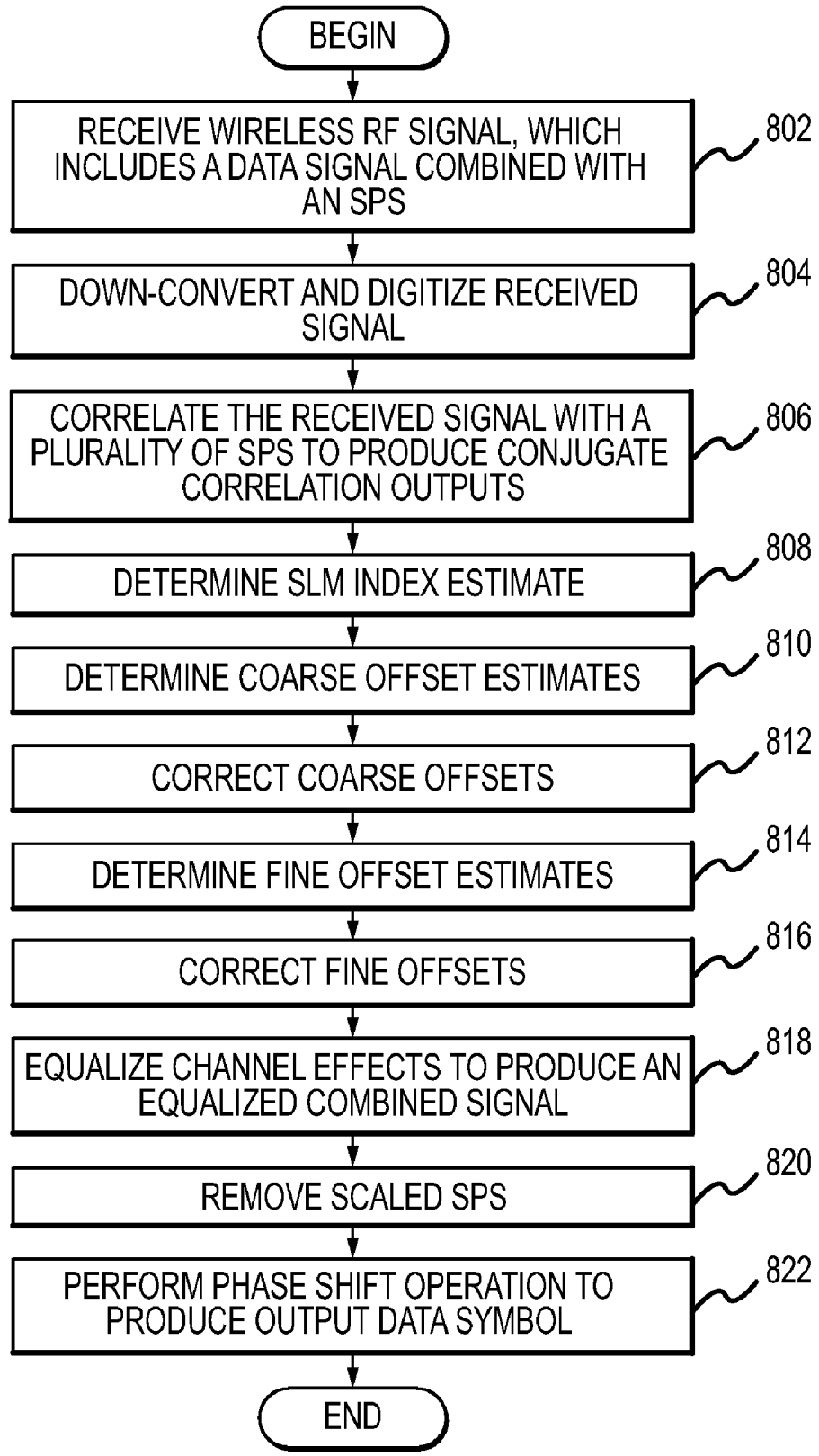
FIG. 8 is a flowchart of a method for receiving and processing wireless signals that include embedded SPS, in accordance with an example embodiment.

FIG. 8 is a flowchart of a method for receiving and processing wireless signals that include embedded SPS, in accordance with an example embodiment. Embodiments of the method are only briefly discussed in conjunction with FIG. 8, as various details and alternate embodiments were discussed in more detail above.

Referring also to FIG. 5, the method may begin, in block 802, when a receiver (e.g., receiver 500) receives (e.g., via antenna 502) a wireless RF signal (e.g., RF signal 530) from the channel. The received RF signal includes a channel-affected version of a data signal combined with an SPS, as discussed in conjunction with the description of embodiments of the transmitter (e.g., transmitter 300, FIG. 3), and embodiments of the method for generating and transmitting the wireless RF signal (e.g., FIG. 7). In block 804, the received RF signal is down-converted and digitized (e.g., by down-converter 532), in order to produce an IF or baseband received signal (e.g., received signal 534).

In block 806, the received signal is correlated (e.g., by correlators 506) with a plurality of SPS (e.g., SPS 538 generated according to an embodiment) to produce a plurality of conjugate correlation outputs (e.g., conjugate correlation outputs 536). In block 808, an SLM index estimate (e.g., SLM index estimate 540) is determined (e.g., by peak detector 508), based on the conjugate correlation outputs.

In block 810, coarse offset estimates (e.g., coarse TO and coarse CFO) may be determined (e.g., by coarse offset estimator 510) based on the conjugate correlation output corresponding to the SLM index estimate. In block 812, corrections are made (e.g., by offset corrector 512) for the coarse timing and carrier frequency offsets in the received signal, in order to produce a coarsely-corrected signal (e.g., coarsely-corrected signal 550). In block 814, fine estimated offsets (e.g., fine CFO, fine TO, and/or phase offset) may be determined (e.g., by fine offset estimator 515) based on the coarsely-corrected signal, and in block 816, additional corrections may be made (e.g., by offset corrector 512 in the time domain or by a frequency-domain offset corrector), in order to produce a finely-corrected signal (e.g., finely-corrected signal 551).

In block 818, channel effects are estimated (e.g., by channel estimator/corrector 516) from a frequency-domain version of the finely-corrected signal. The finely-corrected signal is then equalized based on the estimated channel effects, in order to produce an equalized combined signal (e.g., equalized combined signal 554).

In block 820, a scaled SPS (e.g., scaled SPS 562) corresponding to the SLM index estimate is removed (e.g., by SPS removal element 518) from the equalized combined signal, in order to produce an estimated, phase shifted data signal (e.g., estimated, phase shifted data signal 564), which may be scaled (e.g., by scaling element 520). A phase shift operation is performed (e.g., by phase shift element 522), in block 822, which includes phase shifting the scaled, phase shifted data signal by a phase shift value corresponding to the SLM index estimate. This operation results in the production of an output data symbol (e.g., output data symbol 580), which reflects and estimate of the input data symbol (e.g., input data symbol 320, FIG. 3). The method may then end.

Figure 9:
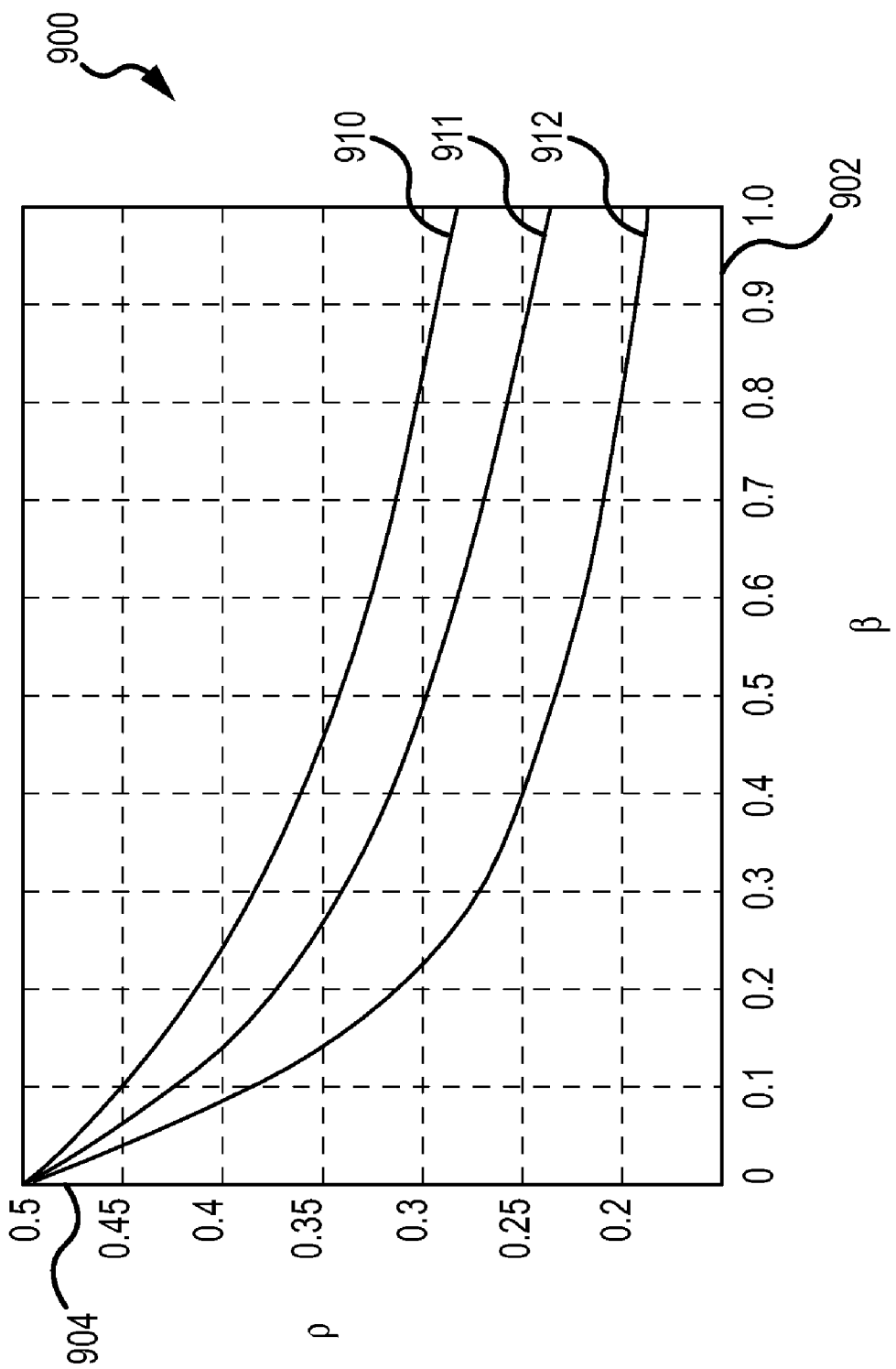
FIG. 9 is a chart plotting relationships between an embedding factor representing a ratio of SPS power to signal power, and a ratio of pilot power to the total SPS power for various ratios of pilot to data subcarriers using three example embodiments.

FIGS. 9-15 indicate potential simulated results for systems that employ various example embodiments. For example, FIG. 9 is a chart 900 plotting relationships between an embedding factor representing a ratio, $\rho$, of synchronization/pilot sequence power to signal power, and a ratio, $\beta$, of pilot power to the total synchronization/pilot sequence power for various ratios of pilot to data subcarriers, or $|K_p|/|K_d|$ using three example SPS-SLM embodiments. Chart 900 includes a $\beta$ axis 902 and a $\rho$ axis 904. As described above in conjunction with Equation 19, the MSE is dependent on the ratio of pilot to data subcarriers. Accordingly, adjusting the ratio of pilot to data subcarriers affects the MSE.

Plot 910 represents simulated results when the relationship between $\rho$ and $\beta$ is $|K_p|/|K_d|=0.15$. Plot 911 represents simulated results when the relationship between $\rho$ and $\beta$ is $|K_p|/|K_p|=0.10$. Finally, plot 912 represents simulated results when the relationship between $\rho$ and $\beta$ is $|K_p|/|K_d|=0.05$.

Figure 10:
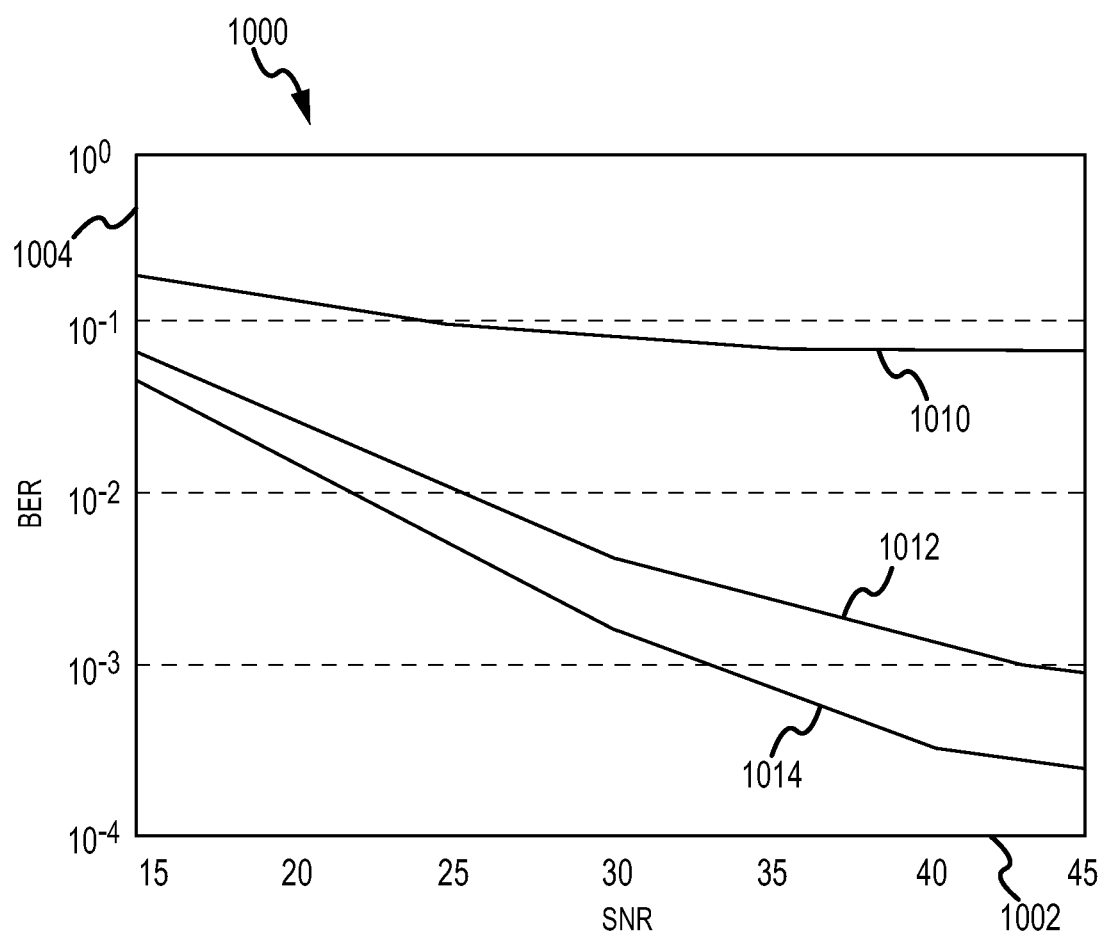
FIG. 10 is a chart plotting bit error rate (BER) performance that may be achieved using two example embodiments.

FIG. 10 is a chart 1000 plotting bit error rate (BER) performance that may be achieved using two example SPS-SLM embodiments. Chart 1000 includes a signal-to-noise ratio (SNR) axis 1002 and a BER axis 1004. The SPS used to generate plot 1000 were generated using a convex optimization algorithm, according to an embodiment. In addition, an ideal soft limiter channel was used with an input backoff of 3 dB. The CFO was set to a constant ($\epsilon=0.2$, where $\epsilon$ is a function of the subcarrier spacing, $1/T_s$, and number of subcarriers, N, where $T_s=NT$, and T is the baseband sampling period: Thus, an $\epsilon=0.2$ represents a carrier frequency offset of 20% of the subcarrier spacing), the multi-path channel was set to length 16 with an exponential delay spread such that $$A \sum_{\tau=0}^{14} e^{-\tau}.$$

Also, N=256, with $|K_p|=16$, $|K_d|=240$, and $|K_n|=0$. The pilot tones were evenly spaced with equal power, and the embedding factors were chosen to be $\beta=0.25$ and $\rho=0.35$.

Trace 1010 plots BER performance for a system in which embedded synchronization was used without any PAR reduction considerations (e.g., the candidate number quantity, D=1, and $S_k^{(1)}$ was generated with a prescribed power profile but random phases). In contrast, trace 1012 plots BER performance for a system in which PAR reduction was achieved using SPS generated in accordance with an embodiment, and with a candidate number quantity, D=1 (no selective mapping). A comparison between plots 1010 and 1012 indicates that significantly improved BER performance may be achieved when PAR reduction is used, in accordance with an example embodiment. Trace 1014 plots BER performance for a system in which SPS-SLM was used with PAR reduction, in accordance with various embodiments, and with a candidate number quantity, D=8. A further comparison between plots 1012 and 1014 indicates that even further improved BER performance may be achieved when the candidate number quantity, D, is increased.

Figure 11:
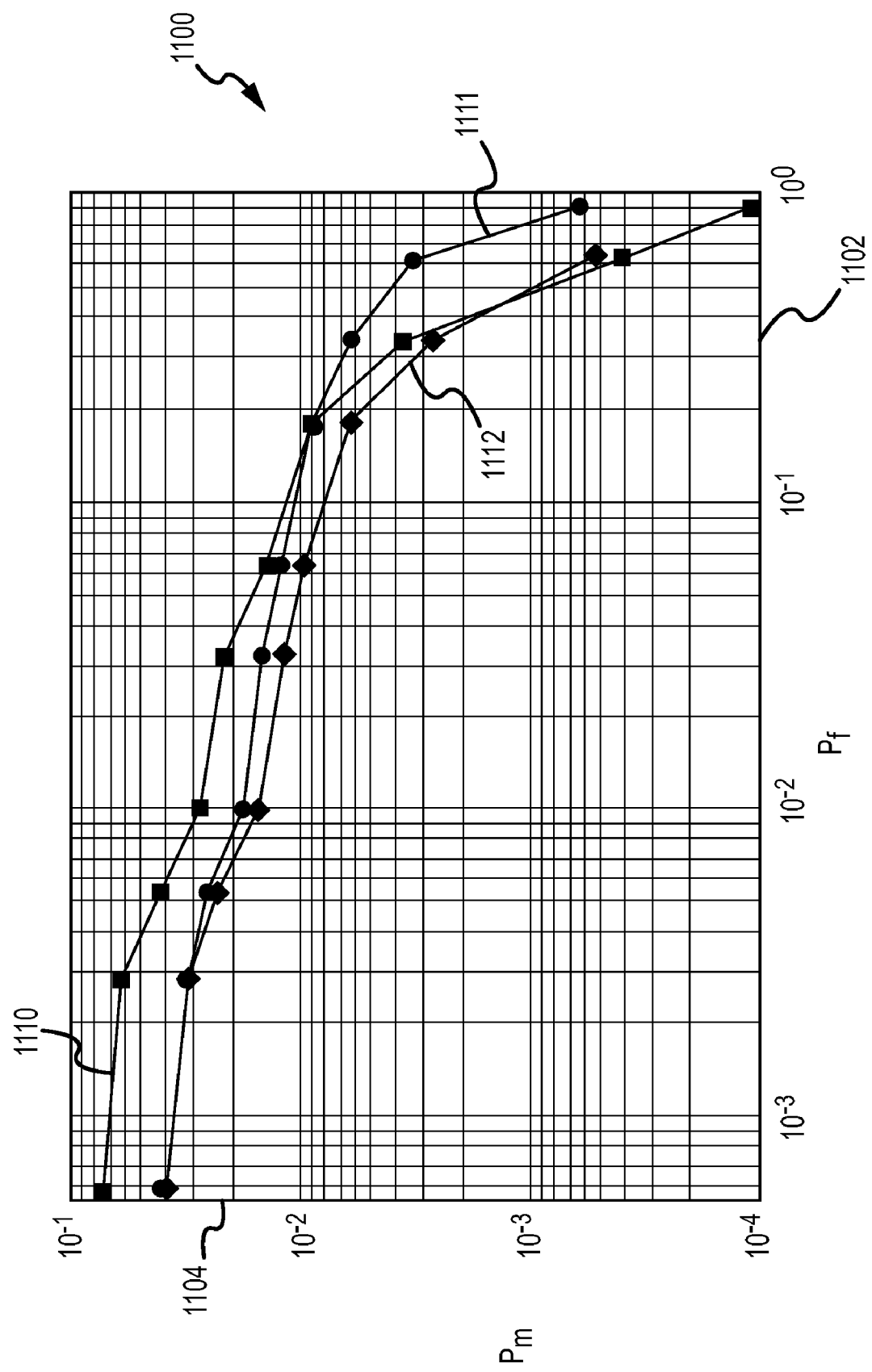
FIG. 11 is a chart indicating acquisition performance for a system employing an embodiment versus a system that uses traditional binary sequences.

FIG. 11 is a chart 1100 indicating acquisition performance for a system employing an embodiment versus a system that uses traditional binary sequences. Acquisition performance was measured as a plot of the probability of false detection, $P_f$ (measured along axis 1102) versus the probability of missed detection, $P_m$ (measured along axis 1104). To generate the chart 1100, an acquisition circuit was simulated, and three different synchronization/pilot sequences having N=64, $K_n=8$, $K_d=49$, $K_p=7$, and a signal-to-noise ratio of about −7 dB. Plot 1110 (square data points) corresponds to a pseudo-noise code derived from an m-sequence with a 31-chip code. To make the bandwidth consistent between codes, the m-sequence chips were repeated to provide two samples per chip. Plot 1111 (circular data points) corresponds to an SPS generated according to an embodiment, where $\beta=1$, and plot 1112 (diamond data points) corresponds to an SPS generated according to an embodiment, where $\beta=1/7$. A comparison between plots 1110-1112 indicates that comparable acquisition performance may be achieved using SPS generated according to an embodiment when compared with traditional m-sequences.

Figure 12:
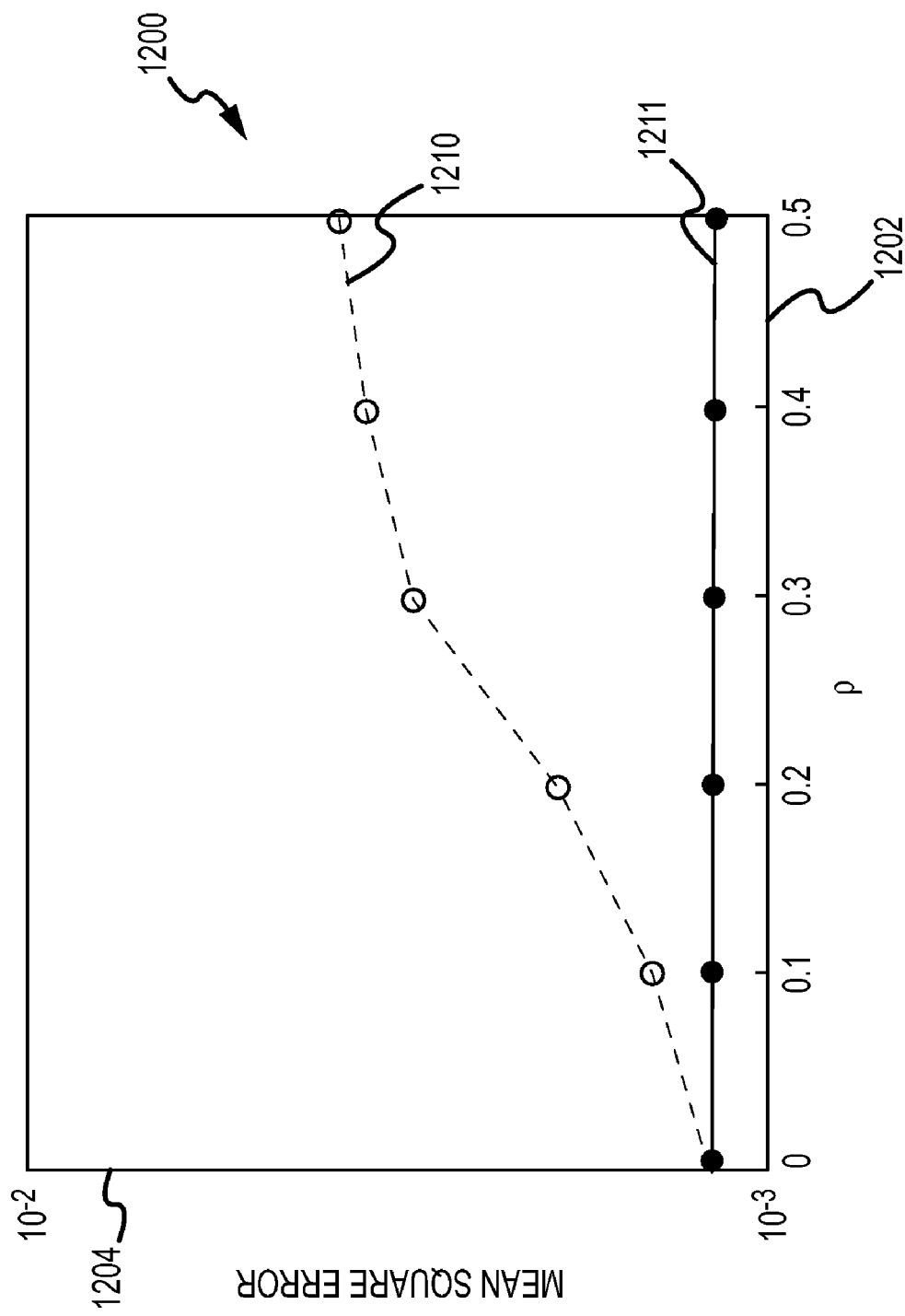
FIG. 12 is a chart indicating channel estimation performance for a system using SPS generated according to an embodiment and a system that uses traditional binary sequences.

FIG. 12 is a chart 1200 indicating channel estimation performance for a system using SPS generated according to an embodiment and a system that uses traditional binary sequences. Channel estimation performance was measured as a plot of the embedding factor, $\rho$ (measured along axis 1202) versus the mean square error (measured along axis 1204). Plot 1210 corresponds to channel estimation performance for a signal in which channel estimation pilots and a pseudo-noise code derived from an m-sequence were embedded according to traditional techniques. Plot 1211 corresponds to channel estimation performance for a signal in which an SPS generated according to an embodiment were embedded. A comparison between plots 1210 and 1211 indicates that low power portions of the m-sequence, which are non-flat frequency response, results in higher mean square error, when compared with an SPS generated according to an embodiment, which has a relatively flat frequency response. Accordingly, the use of SPS generated according to an embodiment may result in significantly improved channel estimation performance.

Figure 13:
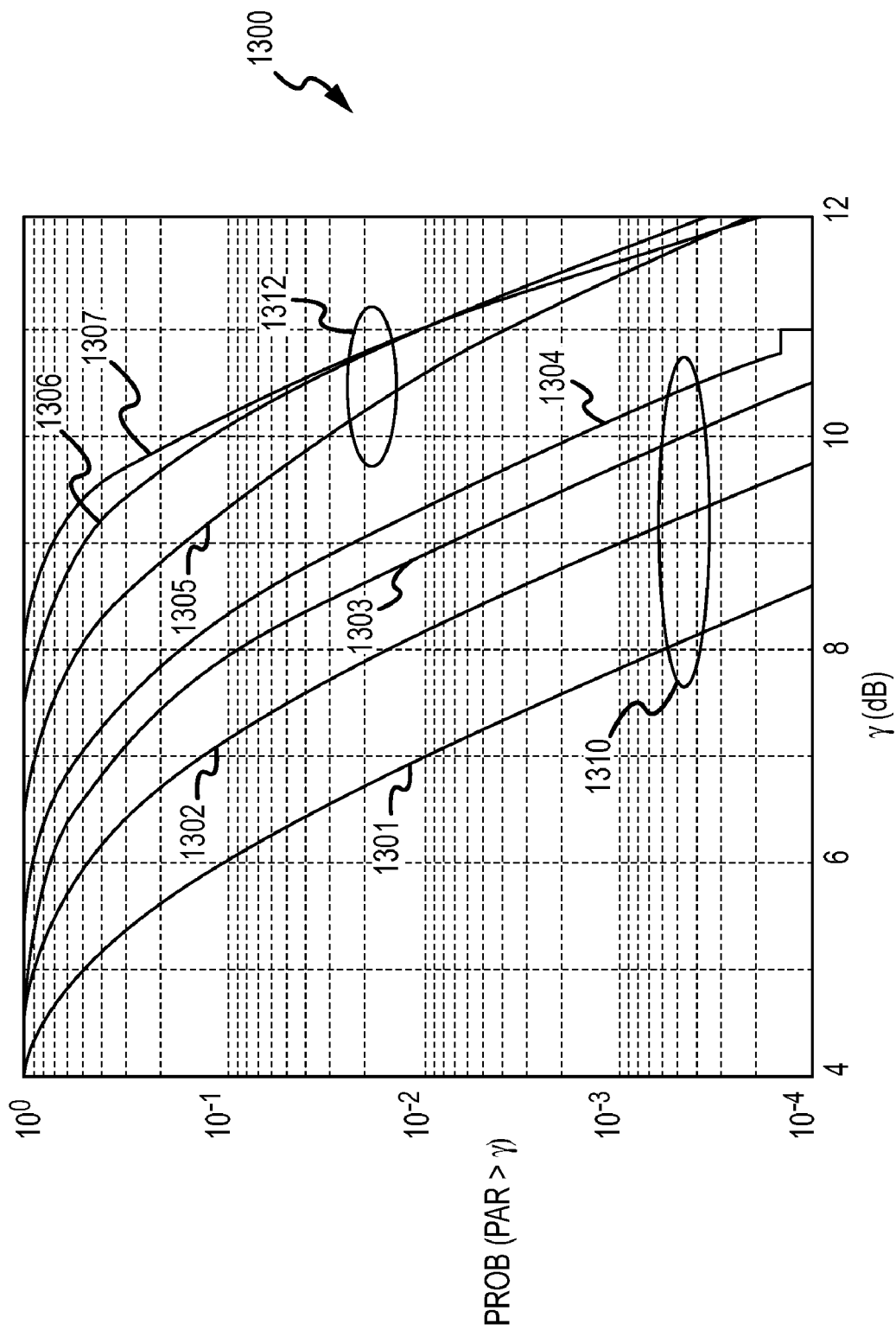
FIG. 13 is a chart illustrating a complementary cumulative distribution function (CCDF) of the peak-to-average ratio (PAR) for signals produced using two different embedding sequences and various embedding factors, in accordance with example embodiments.

FIG. 13 is a chart 1300 illustrating a complementary cumulative distribution function (CCDF) of the PAR for signals produced using two different embedding sequences and various embedding factors, $\rho$, in accordance with various example embodiments. A first group 1310 of traces, which includes traces 1301, 1302, 1303, and 1304, plot CCDF curves that correspond to SPS that are constant modulus with a 0 dB PAR, and for embedding factors of $\rho=0$, $\rho=0.3$, $\rho=0.5$, and $\rho=0.7$, respectively. A second group 1312 of traces, which includes traces 1305, 1306, and 1307, plot CCDF curves that correspond to a time-domain impulse SPS with a 9 dB PAR for embedding factors of $\rho=0.3$, $\rho=0.5$, and $\rho=0.7$, respectively. A comparison between the two groups 1310, 1312 of traces indicates that, for a given embedding factor, significant PAR reductions may be achieved using constant modulus SPS, in accordance with various embodiments. For example, a PAR reduction at the $10^{-3}$ probability level is about 2 dB from the $\rho=0.3$, constant modulus embedded SPS case (trace 1302) to the $\rho=0.3$, 9 dB PAR embedded SPS case (trace 1305).

However, it has been found that, even though SPS generated using a POCS algorithm, in accordance with various embodiments, are not constant modulus, these SPS do have a low enough PAR to realize a large OFDM PAR reduction. When a lowest-PAR SPS found after 300 iterations and 150 initial conditions is embedded into an OFDM signal, a plot (not illustrated) of the CCDF of an OFDM PAR is virtually indistinguishable from the CCDF curves that correspond to SPS that are constant modulus with a 0 dB PAR (e.g., traces 1301-1304.

Figure 14:
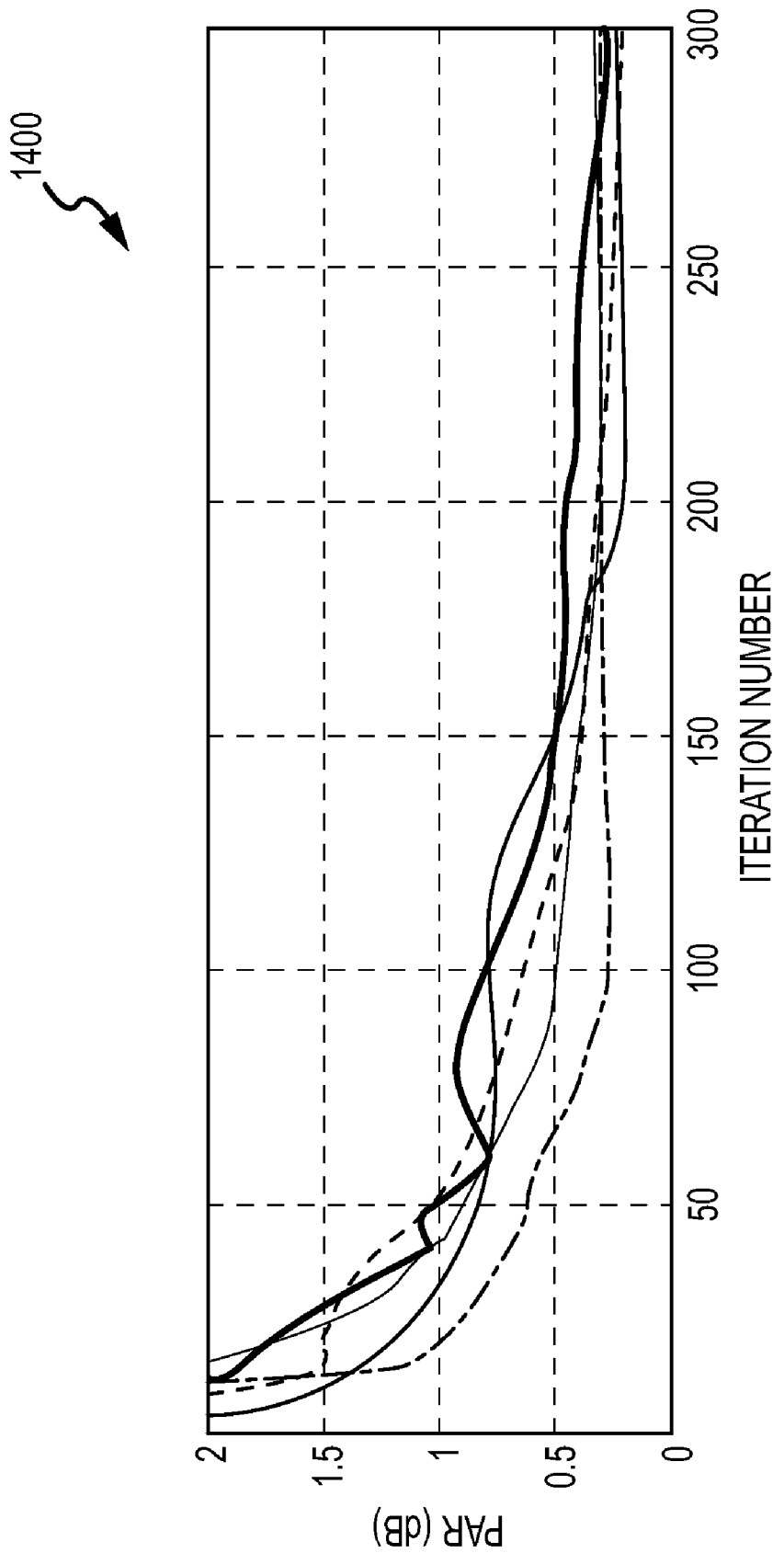
FIG. 14 is a plot of the convergence characteristics of the PAR for five lowest-PAR SPS, which were generated according to an embodiment.

FIG. 14 is a plot 1400 of the convergence characteristics of the PAR for the five lowest-PAR SPS (out of 150 different initial conditions), which were generated according to an embodiment. The parameters used to generate the five traces within plot 1400 were N=64, $K_n=4$, $K_p=7$, and the amount of power in the non-pilot subcarriers was 20 percent of the power in the pilot subcarriers. From plot 1400, it is apparent that the PAR is well below 1 dB for the given initial conditions after 300 iterations. Although the convergence characteristics of the SPS corresponding to the remaining 145 different initial conditions is not plotted in FIG. 14, the PAR was below 1 dB for the vast majority of those remaining SPS.

Figure 15:
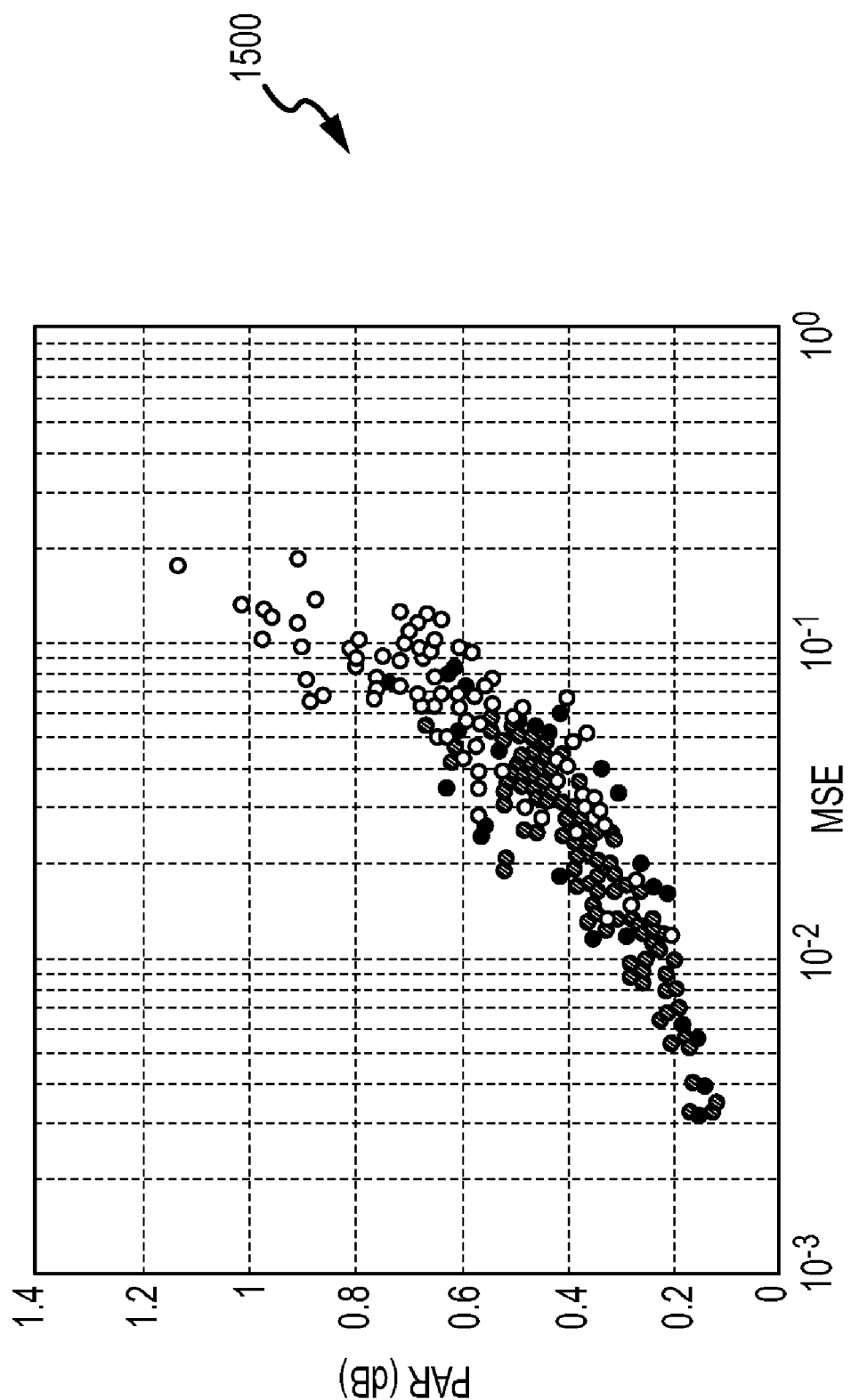
FIG. 15 is a scatter plot of the PAR and mean square error (MSE) after 600 iterations of an embodiment of a method for SPS generation for 150 different initial conditions.

FIG. 15 is a scatter plot 1500 of the PAR and mean square error (MSE) after 600 iterations of the SPS generation methods discussed previously (e.g., blocks 604-616, FIG. 6) for 150 different initial conditions. The parameters used to generate the scatter plot 1500 were the same as for the plot 1400 illustrated in FIG. 14. In scatter plot 1500, MSE corresponds to the mean squared difference between $\hat{S}[k]$ and $\sqrt{P[k]}$, and the PAR is the PAR of $\hat{s}[n]$. As scatter plot 1500 indicates, the PAR and MSE are highly dependent on the initial conditions of the SPS generation algorithm.

Embodiments of methods and apparatus for generating SPS for embedding in wireless signals have now been described above. The foregoing detailed description is merely exemplary in nature and is not intended to limit the inventive subject matter or the application and uses of the inventive subject matter to the described embodiments. Furthermore, there is no intention to be bound by any theory presented in the preceding background or detailed description.

Those of skill in the art will recognize, based on the description herein, that various other apparatus and processes may be included in embodiments of the systems and methods described herein for conditioning, filtering, amplifying, and/or otherwise processing the various signals. In addition, the sequence of the text in any of the claims does not imply that process steps must be performed in a temporal or logical order according to such sequence unless it is specifically defined by the language of the claim. The process steps may be interchanged in any order, and/or may be performed in parallel, without departing from the scope of the inventive subject matter. In addition, it is to be understood that information within the various different messages, which are described above as being exchanged between the system elements, may be combined together into single messages, and/or the information within a particular message may be separated into multiple messages. Further, messages may be sent by system elements in sequences that are different from the sequences described above. Furthermore, words such as "connected" or "coupled to" used in describing a relationship between different elements do not imply that a direct physical connection must be made between these elements. For example, two elements may be connected to each other physically, electronically, logically, or in any other manner, through one or more additional elements, without departing from the scope of the inventive subject matter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled technicians may implement the described functionality in varying ways for each particular application, but such implementation decisions should not be interpreted as causing a departure from the scope of the inventive subject matter.

The various illustrative logical blocks and modules described in connection with the embodiments disclosed herein may be implemented or performed with various types of computational apparatus, including but not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in one or more software modules executed by a processor, or in a combination of the two. A software module may reside in random access memory, flash memory, read only memory (ROM), erasable programmable ROM (EPROM), electrical EPROM, registers, hard disk, a removable disk, a compact disc ROM (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

An embodiment includes a method for generating a set of synchronization/pilot sequences. The method embodiment includes the steps of generating a candidate synchronization/pilot sequence using initial conditions, and repeating the generating step a first number of iterations using different initial conditions for each iteration to generate a plurality of candidate synchronization/pilot sequences. The method embodiment also includes performing a plurality of correlations among the candidate synchronization/pilot sequences to generate a plurality of correlation values, determining a plurality of permutations of the candidate synchronization/pilot sequences, wherein each permutation of the plurality of permutations includes a different set of candidate synchronization/pilot sequences, and wherein each permutation includes a number, D, of candidate synchronization/pilot sequences, and identifying a selected permutation from the plurality of permutations, wherein the selected permutation corresponds to the set of synchronization/pilot sequences being generated.

An embodiment of a method for generating a wireless signal in which a synchronization/pilot sequence is embedded includes the steps of combining each synchronization/pilot sequence of a set of synchronization/pilot sequences with phase shifted input data to produce a plurality of combined signals, determining peak-to-average power ratios for at least some of the combined signals, identifying a selected combined signal based on the peak-to-average power ratios, and transmitting the selected combined signal over a wireless communication channel. In an embodiment, the set of synchronization/pilot sequences includes synchronization/pilot sequences generated by generating a plurality of candidate synchronization/pilot sequences, wherein each candidate synchronization/pilot sequence of the plurality is generated using a different random phase, performing a plurality of correlations among the candidate synchronization/pilot sequences to generate a plurality of correlation values, determining a plurality of permutations of the candidate synchronization/pilot sequences, wherein each permutation of the plurality of permutations includes a different set of candidate synchronization/pilot sequences, and wherein each permutation includes a number, D, of candidate synchronization/pilot sequences, and identifying a selected permutation from the plurality of permutations, wherein the selected permutation corresponds to the set of synchronization/pilot sequences being generated.

While various exemplary embodiments have been presented in the foregoing detailed description, it should be appreciated that a vast number of variations exist. It should also be appreciated that the exemplary embodiments are only examples, and are not intended to limit the scope, applicability or configuration of the inventive subject matter in any way. Rather, the foregoing detailed description will provide those skilled in the art with a convenient road map for implementing various embodiments of the inventive subject matter, it being understood that various changes may be made in the function and arrangement of elements described in an exemplary embodiment without departing from the scope of the inventive subject matter as set forth in the appended claims and their legal equivalents.

What is claimed is:

1. A method for generating a set of synchronization/pilot sequences, the method comprising the steps of:
   generating a candidate synchronization/pilot sequence using initial conditions;
   repeating the generating step a first number of iterations using different initial conditions for each iteration to generate a plurality of candidate synchronization/pilot sequences;
   performing a plurality of correlations among the candidate synchronization/pilot sequences to generate a plurality of correlation values;
   determining a plurality of permutations of the candidate synchronization/pilot sequences, wherein each permutation of the plurality of permutations includes a different set of multiple candidate synchronization/pilot sequences, and wherein each permutation includes a number, D, of candidate synchronization/pilot sequences; and
   identifying a selected permutation from the plurality of permutations based on the correlations among the candidate synchronization/pilot sequences in the selected permutation, wherein the selected permutation corresponds to the set of synchronization/pilot sequences being generated.

2. A method for generating a set of synchronization/pilot sequences, the method comprising the steps of:
   generating a candidate synchronization/pilot sequence using initial conditions by
      generating a constant modulus phase sequence having the initial conditions corresponding to a random phase,
      applying a power profile to the constant modulus phase sequence to produce a power-adjusted phase sequence,
      performing a time-domain transformation of the power-adjusted phase sequence to produce a time-domain sequence,
      setting amplitudes of the time-domain sequence to unity while maintaining phases of the time-domain sequence to produce an amplitude-adjusted time-domain sequence,
      performing a frequency-domain transformation of the amplitude-adjusted time-domain sequence to produce a modified frequency-domain sequence,
      applying the power profile to the modified frequency-domain sequence while maintaining phases of the modified frequency-domain sequence to produce a power-adjusted frequency-domain sequence, and
      repeating, at least an additional time for the power-adjusted frequency-domain sequence, the steps of performing the time-domain transformation, setting the amplitudes, performing the frequency-domain transformation, and applying the power profile to produce the pilot sequence;
   repeating the generating step a first number of iterations using different initial conditions for each iteration to generate a plurality of candidate synchronization/pilot sequences;
   performing a plurality of correlations among the candidate synchronization/pilot sequences to generate a plurality of correlation values;
   determining a plurality of permutations of the candidate synchronization/pilot sequences, wherein each permutation of the plurality of permutations includes a different set of candidate synchronization/pilot sequences, and wherein each permutation includes a number, D, of candidate synchronization/pilot sequences; and
   identifying a selected permutation from the plurality of permutations, wherein the selected permutation corresponds to the set of synchronization/pilot sequences being generated.

3. The method of claim 1, wherein performing the plurality of correlations comprises the steps of:
   performing a plurality of cross-correlations among the candidate synchronization/pilot sequences to generate a plurality of maximum cross-correlation values;
   performing a plurality of auto-correlations among the candidate synchronization/pilot sequences to generate a plurality of secondary maximum auto-correlation values; and
   including the maximum cross-correlation values and the secondary maximum auto-correlation values in the plurality of correlation values.

4. A method for generating a set of synchronization/pilot sequences, the method comprising the steps of:
   generating a candidate synchronization/pilot sequence using initial conditions;
   repeating the generating step a first number of iterations using different initial conditions for each iteration to generate a plurality of candidate synchronization/pilot sequences;
   performing a plurality of correlations among the candidate synchronization/pilot sequences to generate a plurality of correlation values, wherein performing the plurality of correlations comprises performing $P^2$ cross-correlations, and P auto-correlations, where P is a number of candidate synchronization/pilot sequences being correlated;
   determining a plurality of permutations of the candidate synchronization/pilot sequences, wherein each permutation of the plurality of permutations includes a different set of candidate synchronization/pilot sequences, and wherein each permutation includes a number, D, of candidate synchronization/pilot sequences; and identifying a selected permutation from the plurality of permutations, wherein the selected permutation corresponds to the set of synchronization/pilot sequences being generated.

5. The method of claim 1, further comprising
eliminating, from the candidate synchronization/pilot sequences, any candidate synchronization/pilot sequences that do not meet a peak-to-average power ratio selection criteria.

6. The method of claim 5, wherein the step of eliminating uses a peak-to-average power ratio threshold value as the peak-to-average power ratio selection criteria, and comprises eliminating, from the candidate synchronization/pilot sequences, any candidate synchronization/pilot sequence that exceeds the peak-to-average power ratio threshold.

7. The method of claim 6, wherein the peak-to-average power ratio threshold is a threshold value in a range between 0 decibels and 2.0 decibels.

8. The method of claim 1, wherein the step of identifying the selected permutation comprises selecting the selected permutation from the plurality of permutations that corresponds to a maximum cross correlation threshold or a maximum secondary peak of an auto-correlation.

9. The method of claim 1, further comprising the steps of:
combining each synchronization/pilot sequence of the set of synchronization/pilot sequences with phase shifted input data to produce a plurality of combined signals;
determining peak-to-average power ratios for at least some of the combined signals;
identifying a selected combined signal based on the peak-to-average power ratios; and
transmitting the selected combined signal over a wireless communication channel.

10. The method of claim 9, wherein identifying the selected combined signal comprises the step of:
identifying the selected combined signal as the combined signal of the plurality of combined signals that has a lowest peak-to-average power ratio of the peak-to-average power ratios.

11. The method of claim 9, further comprising the steps of:
receiving a received combined signal from the wireless communication channel, wherein the received combined signal represents a channel-affected version of the selected combined signal;
determining estimated channel errors within the received combined signal based on the set of synchronization/pilot sequences; and
applying corrections to the received combined signal, based on the estimated channel errors, to produce output data.

12. A method for generating a wireless signal in which a synchronization/pilot sequence is embedded, the method comprising the steps of:
combining each synchronization/pilot sequence of a set of synchronization/pilot sequences with phase shifted input data to produce a plurality of combined signals, wherein the set of synchronization/pilot sequences includes synchronization/pilot sequences generated by generating a plurality of candidate synchronization/pilot sequences, wherein each candidate synchronization/pilot sequence of the plurality is generated using a different random phase, performing a plurality of correlations among the candidate synchronization/pilot sequences to generate a plurality of correlation values, determining a plurality of permutations of the candidate synchronization/pilot sequences, wherein each permutation of the plurality of permutations includes a different set of multiple candidate synchronization/pilot sequences, and wherein each permutation includes a number, D, of candidate synchronization/pilot sequences, and identifying a selected permutation from the plurality of permutations based on the correlations among the candidate synchronization/pilot sequences in the selected permutation, wherein the selected permutation corresponds to the set of synchronization/pilot sequences being generated;
determining peak-to-average power ratios for at least some of the combined signals;
identifying a selected combined signal based on the peak-to-average power ratios; and
transmitting the selected combined signal over a wireless communication channel.

13. The method of claim 12, wherein identifying the selected combined signal comprises the step of:
identifying the selected combined signal as the combined signal of the plurality of combined signals that has a lowest peak-to-average power ratio of the peak-to-average power ratios.

14. The method of claim 12, further comprising the steps of:
receiving a received combined signal from the wireless communication channel, wherein the received combined signal represents a channel-affected version of the selected combined signal;
determining estimated channel errors within the received combined signal based on the set of synchronization/pilot sequences; and
applying corrections to the received combined signal, based on the estimated channel errors, to produce output data.

15. A system comprising:
a transmitter adapted to generate and transmit a wireless signal in which a synchronization/pilot sequence is embedded by
combining each synchronization/pilot sequence of a set of synchronization/pilot sequences with phase shifted input data to produce a plurality of combined signals, wherein the set of synchronization/pilot sequences includes synchronization/pilot sequences generated by generating a plurality of candidate synchronization/pilot sequences, wherein each candidate synchronization/pilot sequence of the plurality is generated using a different random phase, performing a plurality of correlations among the candidate synchronization/pilot sequences to generate a plurality of correlation values, determining a plurality of permutations of the candidate synchronization/pilot sequences, wherein each permutation of the plurality of permutations includes a different set of multiple candidate synchronization/pilot sequences, and wherein each permutation includes a number, D, of candidate synchronization/pilot sequences, and identifying a selected permutation from the plurality of permutations based on the correlations among the candidate synchronization/pilot sequences in the selected permutation, wherein the selected permutation corresponds to the set of synchronization/pilot sequences being generated,
determining peak-to-average power ratios for at least some of the combined signals,
identifying a selected combined signal based on the peak-to-average power ratios, and
transmitting the selected combined signal over a wireless communication channel.

16. The system of claim 15, wherein the transmitter is a wireless communication device selected from a group that includes a cellular telephone, a radio, an unmanned autonomous vehicle, a one-way pager, a two-way pager, a personal data assistant, a computer, a base station, a wireless transmitter, and a wireless transceiver.

17. The system of claim 15, wherein the transmitter is further adapted to identify the selected combined signal by identifying the selected combined signal as the combined signal of the plurality of combined signals that has a lowest peak-to-average power ratio of the peak-to-average power ratios.

18. The system of claim 15, further comprising:
a receiver adapted to receive a received combined signal from the wireless communication channel, wherein the received combined signal represents a channel-affected version of the selected combined signal, determine estimated channel errors within the received combined signal based on the set of synchronization/pilot sequences, and apply corrections to the received combined signal, based on the estimated channel errors, to produce output data.

19. The system of claim 18, wherein the receiver is a wireless communication device selected from a group that includes a cellular telephone, a radio, an unmanned autonomous vehicle, a one-way pager, a two-way pager, a personal data assistant, a computer, a base station, a wireless transmitter, and a wireless transceiver.

20. The system of claim 15, wherein the system is a multi-carrier communication system selected from a group that includes a multi-carrier based, ultra-wideband system, an orthogonal frequency division multiplexing multiple access system, a multi-carrier code division multiple access system, a digital video broadcasting system, a WiMax system, a long range broadband wireless system, a wireless local area network system, and an 802.11a system.

* * * * *